(12) United States Patent
Van Dyne

(10) Patent No.: US 11,232,500 B1
(45) Date of Patent: Jan. 25, 2022

(54) METHOD AND APPARATUS FOR MARKETING AND SELLING REAL PROPERTY

(71) Applicant: Donald Van Dyne, Chelmsford, MA (US)

(72) Inventor: Donald Van Dyne, Chelmsford, MA (US)

(*) Notice: Subject to any disclaimer, the term of this patent is extended or adjusted under 35 U.S.C. 154(b) by 150 days.

(21) Appl. No.: 16/115,954

(22) Filed: Aug. 29, 2018

Related U.S. Application Data

(63) Continuation of application No. 14/053,982, filed on Oct. 15, 2013, now abandoned.

(60) Provisional application No. 61/713,771, filed on Oct. 15, 2012.

(51) Int. Cl.
  *G06Q 30/00* (2012.01)
  *G06Q 30/06* (2012.01)
  *G06Q 50/16* (2012.01)

(52) U.S. Cl.
  CPC ......... *G06Q 30/0611* (2013.01); *G06Q 50/16* (2013.01)

(58) Field of Classification Search
  CPC ........................... G06Q 30/0611; G06Q 50/16
  USPC ................................................ 705/26.1–27.2
  See application file for complete search history.

(56) References Cited

U.S. PATENT DOCUMENTS

| | | | |
|---|---|---|---|
| 6,684,196 B1* | 1/2004 | Mini ...................... | G06Q 30/02 705/14.34 |
| 7,085,735 B1* | 8/2006 | Hall ........................ | G06Q 10/00 705/38 |
| 2010/0088238 A1* | 4/2010 | Butterfield ......... | G06Q 30/0283 705/80 |
| 2010/0106651 A1* | 4/2010 | Tate ..................... | G06Q 50/188 705/80 |
| 2011/0145084 A1* | 6/2011 | Paone ................... | G06Q 30/08 705/26.1 |

OTHER PUBLICATIONS

Bichler, M., Kersten, G. & Strecker, S. Towards a Structured Design of Electronic Negotiations. Group Decision and Negotiation 12, 311-335 (2003). https://doi.org/10.1023/A:1024867820235 (Year: 2003).*

* cited by examiner

*Primary Examiner* — Anand Loharikar
(74) *Attorney, Agent, or Firm* — Lando & Anastasi, LLP

(57) ABSTRACT

A system includes a memory and a processor configured to receive at least one seller parameter including a minimum value associated with a sale of property and acceptable purchase conditions for instant sale of the property; maintain the at least one seller parameter confidential; generate a user interface for displaying a property listing that includes a timeline display, and for entering a binding offer with at least one buyer condition; receive a binding offer from a buyer that includes an offer price and the at least one buyer condition; evaluate the offer against the at least one seller parameter to determine an accepted status for offers meeting the minimum value and the acceptable purchase conditions for instant sale of the property; responsive to the offer having the accepted status, instantly binding the seller and buyer to complete the sale without further interaction; and communicate sale information to the buyer.

8 Claims, 22 Drawing Sheets

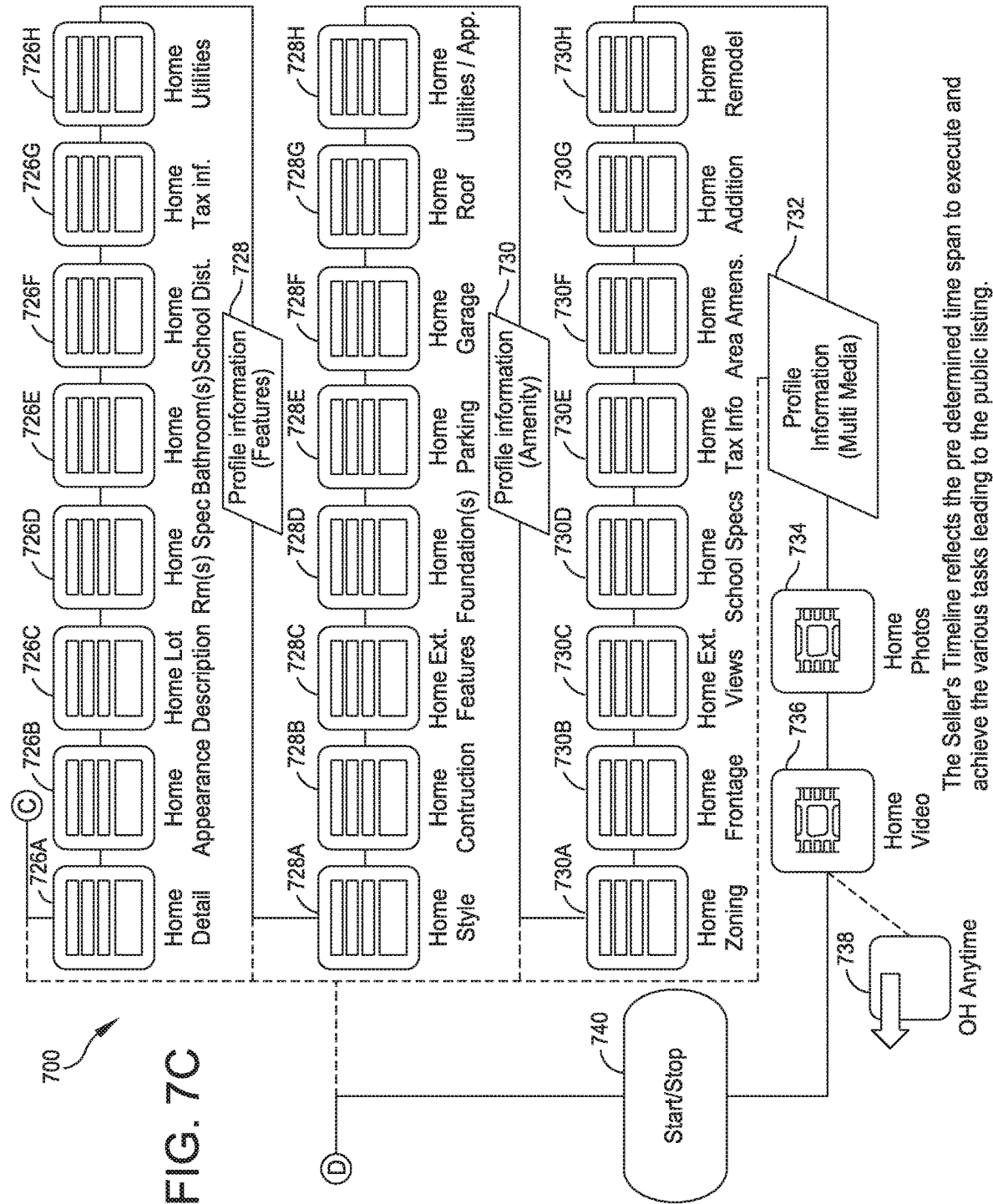

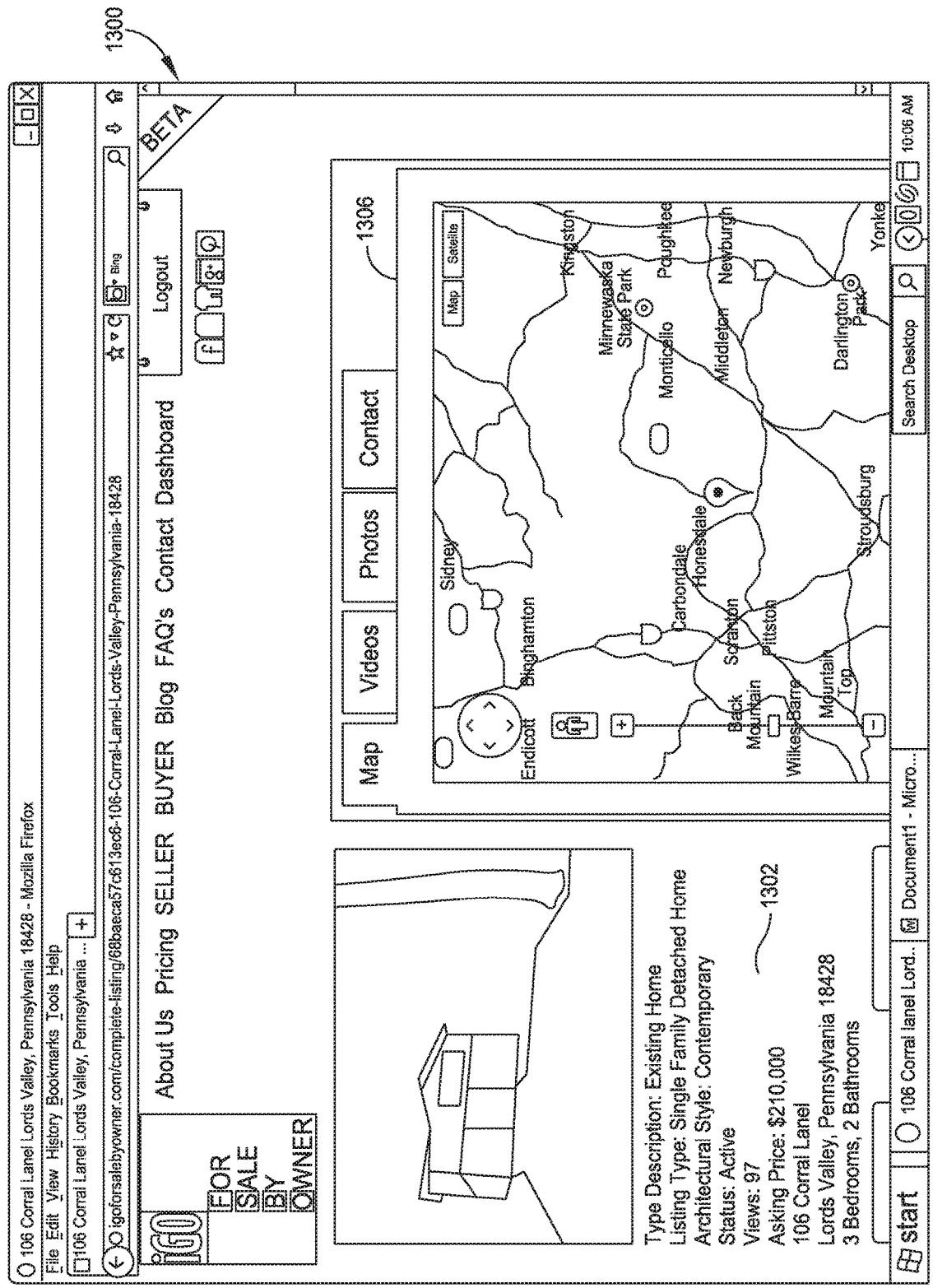
FIG. 13A1

TIMELINE Notes

1310 Beautiful home well maintained is a gated community in the Pocono mountains.
Front Deck scheduled to be powerwashed and stained the week of the 24th.
Put it on your Watchlist to receive updates as more information is added. Be the first to know.

Floor: First Floor

1312 Floor: Second Floor
- Rm: Bathroom (master) Length: 5 Width: 7
- Rm: Sunroom
- Rm: Kitchen
- Rm: Dining Room
- Rm: Living Room
- Rm: Master Bedroom Length: 12 Width: 24

Floor: First Floor
- Rm: Game / Play / Recreation Room
- Rm: Laundry
- Rm: Bedroom
- Rm: Bedroom
- Rm: Media Room
- Rm: Bathroom (full)

House / lot Details

1314
Construction: Frame
Flooring: Tile
Foundation: Concrete Block
Garage: Carport
Lighting: Natural
Parking: Driveway - Paved
Road Access: Dead End
Roof: NA
Siding: Wood
Street Frontage: (Sq. Ft.): NA
Tax Section: NA
Tax Details: NA
Zoning: Residential
Easement: NA

Exterior Features

1316
Balcony*
Deck* Length: 30 Width: 8
Decorative Lighting
Professional Landscaping
Storage Shed*

FIG. 13B1

Kitchen & Appliances
1318

Countertops: Ceramic Tile
Dishwasher: Yes
Disposal: No
Freezer: Yes
Island: No
Oven: Electric
Pantry: No
Range: Electric
Refrigerator: Yes
Trash Compactor: No
Kitchen Upgraded: Yes When: 2010
Notes: 3 years old
Dryer: Electric
Washer: Yes

Area Amenities
1322

Attractions: Beach, Bus Route, Church (Roman Catholic), Church (Protestant), Coffee Shop, Fire Station, Golf Course, Grocery Store, Highway Access, Jogging/Walking Trails, Library, Police Station, Post Office, Public Park, Swimming Pool, Synagogue, Tennis Court
View: Beach, Lake
School District: Wallenpaupack School District
Day Care: N/A
Elementary: 5 Miles or Less
Middle: 5 Miles or Less
High School: 5 Miles or Less
University: N/A
Vocational: N/A

Utilities
1320

Cooling:
Electricity: Circuit Breakers
Heating: Electric Baseboard
Hot Water: Electric

Listing QR Code
1324

Right click and choose "Save Image As" to download QR Code.

METHOD AND APPARATUS FOR MARKETING AND SELLING REAL PROPERTY

CROSS-REFERENCE TO RELATED APPLICATIONS

This application is a continuation of U.S. patent application Ser. No. 14/053,982, titled "METHOD AND APPARATUS FOR MARKETING AND SELLING REAL PROPERTY", filed on Oct. 15, 2013, which claims priority under 35 U.S.C. § 119(e) to U.S. Provisional Patent Application Ser. No. 61/713,771, titled "METHOD AND APPARATUS FOR MARKETING AND SELLING REAL PROPERTY", filed on Oct. 15, 2012, each of which is herein incorporated by reference in its entirety.

BACKGROUND

Traditional buyers and sellers of real property are often confronted with an expensive, confusing, and time-consuming process for buying and selling homes. Various conventional approaches exist for assisting sellers and buyer. However, these conventional approaches place the burden of creating listings and marketing such listings on the buyers and sellers. Without adequate assistance these For Sale By Owner ("fsbo") sites fail to adequately support the average home seller and fail to adequately inform the average home buyer.

SUMMARY

Accordingly, provided are embodiments of an fsbo system which are configured to support average buyers and sellers in the marketing and sales of real property. In some implementations, the fsbo system includes a web-based, multi-media platform to market, buy and sell real property without a broker. In further embodiments, the fsbo system is configured to generate instant feedback to a potential buyer responsive to the buyer's submission of an offer to purchase. In other embodiments, the fsbo system can be configured to process buyer offers. For instance, the fsbo system can return instant status for such offers. The offers can include buyer contingencies which are evaluated against seller-defined criteria to return instant status. The system can also be configured to return status information including accepted, rejected, and recognized status responsive to at least the buyer contingencies and the seller criteria. Thus, stated broadly, various aspects of this disclosure eliminate the middle man from real property sales and in some embodiments, also eliminate the time consuming phase of person to person negotiation.

According to some embodiments, the fsbo system can be implemented as a service delivered to consumers via third party licensees. For instance, the third party licensees can host the fsbo system or provide access to the fsbo system through their own platforms or web pages. In some implementations, the third party licensees provide the fsbo system to facilitate consumer creation of listings and execution of property sales transactions. In other embodiments, facilitation operations can be provided by the same entity hosting the fsbo system.

According to one aspect, a system for automatic management of property sales is provided. The system comprises a memory; and at least one processor operatively connected to the memory, the processor when executing being configured to receive at least one seller parameter based on input from a user, the at least one seller parameter including a minimum value associated with a sale of property; maintain the minimum value associated with the sale of the property confidential with the user; receive an offer from a buyer, the offer including at least an offer price; automatically evaluate the offer against the at least one seller parameter to determine a status; and communicate the status to the buyer.

In one embodiment, the status is at least one of accepted, rejected, and recognized. In one embodiment, the processor is further configured to evaluate the offer against at least one of accepted criteria, rejected criteria, and recognized criteria based on the at least one seller parameter. In one embodiment, the at least one processor is further configured to determine the status is recognized, responsive to determining that the offer price is equal to or greater than the minimum value and includes at least one request not included in the at least one seller parameter. In one embodiment, the at least one processor is further configured to determine that the status is recognized, responsive to determining that the offer price is within a predefined variation of the minimum value.

In one embodiment, the at least one processor is further configured to communicate the status to the buyer via an instant message. In one embodiment, the at least one processor is further configured to assign support personnel to the user. In one embodiment, the at least one processor is further configured to generate a timeline display for the property, the timeline display defining at least a preparation period, a marketing period, and an offer acceptance period for the property. In one embodiment, the at least one processor is further configured to update the timeline display. In one embodiment, the at least one processor is further configured to receive an appraisal for the property as part of the sale of the property. In one embodiment, the at least one processor is further configured to require a mortgage pre-approval for the buyer in order to receive the offer.

According to one aspect, a computer implemented method for automatic management of property sales is provided. The method comprises receiving, by a computer system, at least one seller parameter based on input from a user, the at least one seller parameter including a minimum value associated with a sale of property; maintaining, by the computer system, the minimum value associated with the sale of the property confidential with the user; receiving, by the computer system, an offer from a buyer, the offer including at least an offer price; automatically evaluating, by the computer system, the offer against the at least one seller parameter to determine a status; communicating, by the computer system, the status to the buyer.

In one embodiment, determining the status for the offer includes determining that the offer matches one of accepted criteria, rejected criteria, and recognized criteria based on the at least one seller parameter. In one embodiment, determining the status for the offer includes determining that the status is recognized responsive to the offer being equal to or greater than the minimum value and includes at least one request not included in the at least one seller parameter. In one embodiment, determining the status as recognized includes determining that the offer is within a predefined variation of the minimum value. In one embodiment, communicating the status to the buyer includes communicating an instant message to the buyer.

In one embodiment, the method further comprises assigning support personnel to the user. In one embodiment, the method further comprises generating a timeline display for the property, wherein the timeline display defines a preparation period, a marketing period, and an offer acceptance period for the property. In one embodiment, the method further comprises updating the timeline display. In one embodiment, the method further comprises receiving an appraisal for the property as part of selling the property. In one embodiment, the method further comprises requiring a mortgage pre-approval for the buyer in order to receive the offer.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIGS. 7A-E illustrate a flow diagram of a web-based, multimedia platform to market, buy, and sell real property from the perspective of a seller in accordance with an embodiment of the present invention;

FIG. 11 is an example user interface for managing a seller's timeline, according to one embodiment;

FIG. 12 is an example user interface according to one embodiment;

FIGS. 13A-C illustrate an example user interface according to one embodiment;

FIG. 14 is an example user interface according to one embodiment; and

DETAILED DESCRIPTION

Figure 1:
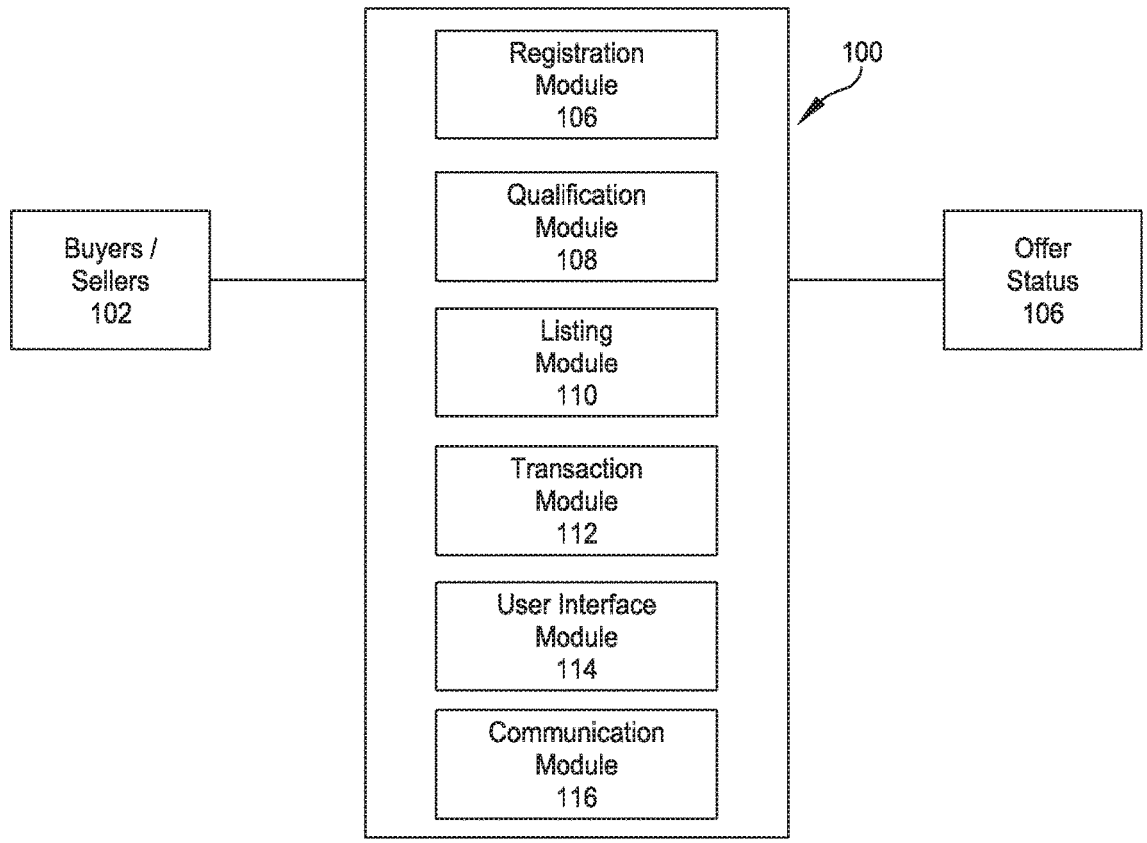
FIG. 1 is a block diagram of an example fsbo system, including an fsbo engine, according to one embodiment.

Stated broadly, various aspects of the disclosure are directed to systems and methods for managing and providing automatic and immediate feedback on offers to purchase property. The offers to purchase can be made on real property (i.e., homes for sale) without the need for brokers or agents to mediate the transaction. Further, home buying contingencies can be anticipated and accounted for in such transactions, allowing embodiments of the systems and methods to provide automatic acceptance, rejection, and/or instant notification regarding offers to purchase.

According to aspects and embodiments, a system is provided for managing offers to purchase homes for sale by a respective owner. Example embodiments of a fsbo system can include support teams that facilitate marketing, listing, and purchasing property through the fsbo system. In some embodiments, the system can assign users to support teams directly. Alternatively, the fsbo system and/or functions are provided to a licensee as a service, and the licensee provides the support team to facilitate marketing, listing, and purchasing property. In some examples, the support team may facilitate generation of listings for property sales, and can also facilitate identification of interesting property to a prospective buyer.

In some embodiments, the system is configured to qualify sellers and buyers. For example, the system can validate each potential seller and each potential buyer against qualification criteria to identify series participants. In some settings, the support team facilitates the qualification of users. Property listings and system functions (e.g., offer submission) can be limited to qualified users.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Example FSBO System

FIG. 1 illustrates one embodiment of a fsbo system 100. The fsbo system 100 can be configured, for example, to manage property listings, execute listing searches, manage purchase offer submission, execute automatic acceptance/rejection of offers, and execute purchase transactions for accepted offers. The system 100 can be implemented in a managed environment where a support team facilitates the use of the system, generation of listings, and in particular generation of a seller's passbook. The seller's passbook can include required information for demonstrating a potential seller is serious (i.e., qualified). In one embodiment, the system is configured to require an appraisal of the property being sold in order to qualify the seller. The appraisal can be incorporated into the seller's passbook, which can be provided by the system as part of the listing shown to a potential buyer. Both buyers and sellers 102 can access the system 100 to create or view property listings (e.g., including a seller's passbook). Buyers (e.g., 102) can also access the system 100 to submit offers for listed property and receive status on their offer automatically, e.g., at 104. The returned status can include any one of accepted—in which case the system 100 will manage the execution of the purchase transaction for the property; rejected—where the offers does not meet the seller's criteria; and recognized—where the offer meets the seller's defined criteria with contingencies or within an acceptable deviation of the seller's criteria.

Figure 15:
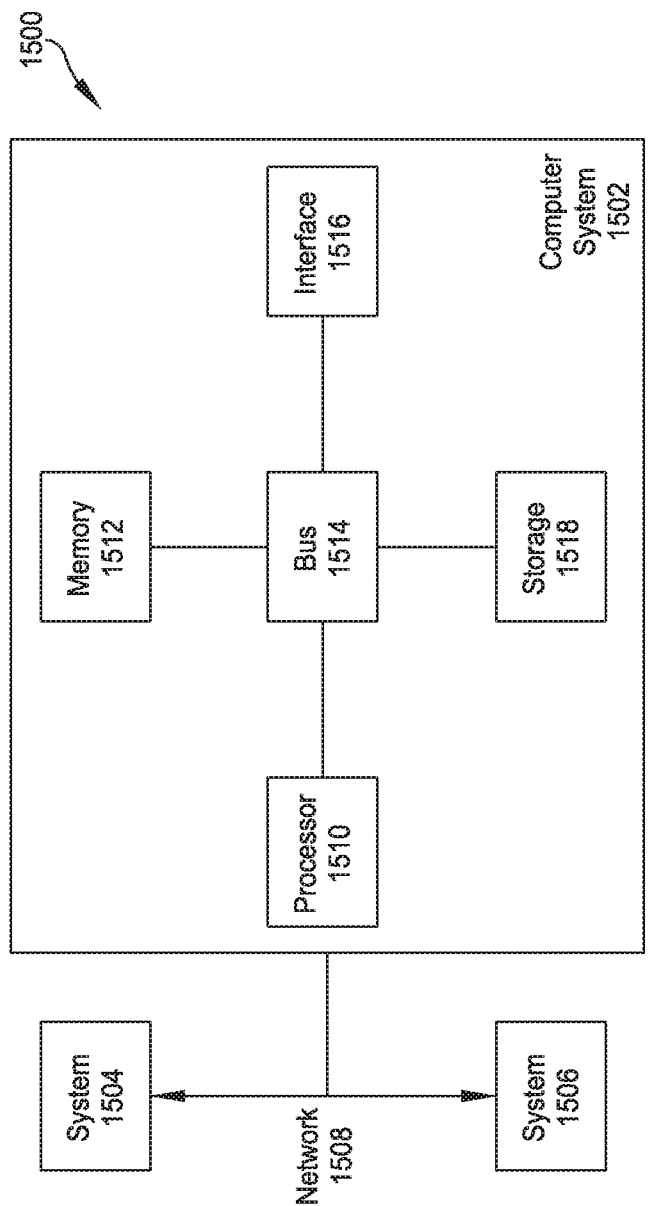
FIG. 15 is a schematic diagram of an exemplary computer system that may be specially configured to perform processes and functions disclosed herein.

According to various embodiments, the fsbo system 100 can be executed on a specially configured general purpose computer (e.g., 1500 or 1502 as shown in FIG. 15). The system can be accessed through the Internet, and a user (e.g., buyers and sellers 102) can access the system via any connected devices (e.g., smart phones, tablets, mobile computers, etc.). In some embodiments, the buyer and sellers access the fsbo system 100 directly. In other embodiments, buyers and sellers access the fsbo system through an intermediary. The intermediary can be a licensee who hosts or provides access to the fsbo system 100, for example, through their own web presence.

In further embodiments, the fsbo system 100 can be connected to any communication network including, for example, the Internet. The fsbo system 100 may be accessed over LAN, WAN, MAN networks, and may also be restricted to private network configurations, virtual network (e.g., vLAN, etc.), and can also be implemented as a cloud-based service, accessed by buyers and sellers directly or through a licensee site.

Depending on the environment, users can register with the fsbo system 100 by inputting registration information into a user interface displayed on a web browser. In some embodiments, the fsbo system 100 can include a registration module 106 configured to accept and process registration information from users. Responsive to receipt of registration information (e.g., by module 106), the system 100 can create user accounts and maintain qualification information on respective users. In some embodiments, registration can also include registration by licensees to the fsbo system 100. For example, registration can include creating licensee user accounts on the fsbo system 100 to administer licensee functions on the fsbo system.

The licensee accounts are configured to provide additional access to the fsbo system relative to buyer and seller users. Licensee accounts can be configured with management functions. In some embodiments, licensee accounts are configured with access to buyer and seller accounts. Licensee users can facilitate creation of seller listings, identification of interesting properties to buyers, updating listings with additional information (including e.g., property appraisals, inspection reports, community information, etc.). In further embodiments, licensee access can also include functions to manage qualification of serious sellers or serious buyers. The system can be configured to enable licensee accounts to manage qualification status of respective buyers and sellers. For example, in response to receiving mortgage pre-approval information, the licensee can change the status for a buyer to be qualified.

According to other embodiments, the system 100 can manage user qualification status automatically. For example, in response to a buyer uploading mortgage pre-approval documentation, the system can automatically update the user's status. In another example, in response to a seller uploading an appraisal for a home listing, the seller's status can be automatically changed to qualified. In some embodiments, the system 100 can include a qualification module 108 that manages user status responsive to meeting qualification requirements. Qualification status can be used by the system to limit access to property listings, limit access to offer submissions on listings, among other options.

According to some embodiments, once a user (e.g., buyer or seller) has registered to use the system, the user can view or create listings for property. In some implementations, unregistered user can also be given access to view listings. However, access to detailed information and/or other functions of the system can be limited to registered users. If the user wishes to sell a property, the system provides instructions and recommendations, and can also connect the user to a support team to facilitate generation of the listing. The support team can also provide instruction on meeting qualification requirements, for example, to create a qualified listing.

According to one embodiment, system 100 can include a listing module 110 configured to guide a user through creation of a listing. In creating a listing, the system requires identification of the property to be sold. For example, for real property, the address, city, town and state must be entered. For other types of property, similar identification can be required by the system and/or listing module 110. The system can be configured to bundle information provided by the seller into a listing data object. The listing data objects can then be viewed on the system by potential buyer.

In some implementations, support teams are made available to facilitate the creation of the listings and associated data. For example, a listing can include a seller's passbook. The support team can provide information on how to complete the seller's passbook and link users to service vendors, for example, to complete an appraisal, a home inspection, etc. According to some embodiments, the seller's passbook can be configured to educate potential buyers on the fsbo purchase process and the respective property. In some examples, the seller's passbook can include any one or more of: a personal letter from the seller to the buyer, a description of the fsbo purchase process, a summary of the function of the seller's parameters (any actual or specific requirements input by a seller are held in confidence by the fsbo system), a visualization of the seller's timeline for selling property (e.g., marketing period, offer acceptance period, etc.), a listing sheet (e.g., similar to MLS listing information), a home operating budget (e.g., typical expenses for electricity, heat, water, etc.), a professional appraisal report, a professional home inspection report, a disclosure statement, a CLUE report (Comprehensive Loss Underwriter's Exchange report—which can include five (5) years of data regarding claims, the amount paid, location of the loss, cause of the loss and other related information), a sample offer sheet, a plot plan, a tax bill, floor plans (where available), a community profile report, an explanation of what to expect after a buyer's offer is accepted, and directions to the house for sale. The support team can facilitate capturing each piece of information to include in the seller's passbook and provide referral to service providers for each type of documentation. Alternatively, and/or in conjunction, the fsbo system can likewise walk the user through generating the information in the seller's passbook. The system can provide links to recommended vendors and provide education material on preparing the passbook.

According to some embodiments, the system can provide messaging functions between users (e.g., seller) and assigned support teams, for example, to facilitate listing creation. As discussed, the system can automatically assign the support team, for example, in response to the user selecting functions on the system to create a listing and provide information to the user. In a licensee model where users access the fsbo system and/or fsbo functions through a licensee, the system can also be configured request that the licensee system(s) provide information on a support team to assign.

The support team can facilitate the seller entry of information on the property they wish to sell. Further, the support team can communicate with the seller to best position their property for sale. In one example, the support team and/or the fsbo system (e.g., 100) provides information on staging the home, developing a cosmetic report, incorporating video tours into the seller's listing, incorporating professional inspections, appraisals, creating marketing materials (e.g., flyers, postcards, listing sheets similar to MLS), among other examples. Additionally, the system can facilitate site visits by the support team. In one example, the system automatically schedules a property walkthrough by at least one member of the assigned support team. The support team can provide recommendation and feedback to the seller directly. Additionally, or alternatively, the support team can generate work lists for the seller through the system to improve the listing, the property, etc. In one example, the walkthrough enables the support team create a staging report and a cosmetic report. These reports detail how the seller can improve the appearance of their property and potentially increase a sales price.

According to one embodiment, the system can be configured to schedule a second visit by the support team to facilitate creation of a marketing video. The marketing video can include a video tour of the property for sale. In some implementations, virtual tour services can be provided by associated sites (e.g., myopenhouseanytime.com). According to one embodiment, the associated site can be configured to allow a potential buyer to schedule and conduct a virtual tour of a property without seller interaction.

In some embodiments, the support team and/or the fsbo system provides recommendations for third party vendors who prepare and submit cosmetic reports, and/or staging reports to the fsbo system. For example, the fsbo system can direct the seller to professional appraisers for scheduling an appraisal. The system 100 can also be configured to display third party providers capable of generating information or providing services for improving the seller's listing. In one example, professional appraisers can be displayed to the seller in response to identification of the property they wish to sell. The professional appraiser listing displayed by the system can be matched to the user's current location (e.g., registration address) and/or the property location. In other embodiments, the system and/or licensees can filter or pre-define third parties who are displayed to potential sellers by the fsbo system.

According to one embodiment, the fsbo system can require an appraisal as part of generating a listing for a qualified or "serious" seller. According to one aspect, the appraisal sets the benchmark for the asking price and provides confidence to both the seller in setting their asking price and to the buyer in providing assurance that property is worth the asking price. The appraisal can be bundled as part of the seller's passbook and viewed as part of a property listing. In one embodiment, the fsbo system organizes each listing as a listing data object that is viewable and searchable on the fsbo system. According to one embodiment, the listing data object includes the seller's passbook and any appraisal.

In addition to requiring an appraisal for a qualified seller, the fsbo system 100 can also require that the seller define seller parameters under which the seller will accept a purchase offer. In one example, the seller specifies a listing price the seller wishes to receive. In addition, the seller can specify a sales amount that sets the price boundary or minimum limit the home seller will accept, potentially, below the list price. This environment is unique, in that even offers that do not meet the current list price can be accepted by the system, and additionally can be automatically processed by the system to return nearly instantaneous acceptance and/or rejection. In some examples, contingent offers may still need to reviewed by the seller prompting a returned status of recognized by the system (e.g., by a transaction module 112—discussed in greater detail below). In further examples, a home seller can also specify a variation threshold below the minimum price that would not trigger an automatic acceptance, but close enough that the seller is willing to further consider the offer ("recognized").

According to one embodiment, the fsbo system 100 and/or the listing module 110 requests information from buyers and sellers through one or more user interface displays, which prompt seller for input on any one or more of: a listing price, a minimum price the seller is willing to accept, any contingencies the seller is willing to accept, and optionally any variation on the minimum price the seller is willing to consider. In some examples, the seller can access the fsbo system and revise their seller's parameters. The fsbo system 100 and/or listing module 110 can be configured to store the seller's parameters in association with the seller's listing, such that the system can automatically accept offers from willing buyers.

As part of listing generation, the user can also specify a seller's timeline. For example, the seller's timeline can detail time periods for preparing a house for sale, marketing the house for sale, and the time period during which the seller accepts offers to purchase through the fsbo system 100. In one embodiment, the timeline is displayed as part of the property listing and is updated by the system regularly. In one example, the timeline displays a preparation period, a marketing period, and an offer acceptance period. The timeline display is configured to provide buyers heightened awareness on interesting properties thereby increasing interest and excitement.

In some embodiments, sellers can also input time-based criteria on their minimum price, and deviation amount. The system can be configured to accept and store time-based seller's parameters requirements. For example, as the seller's timeline nears conclusion, the seller may be willing to accept a lower price to move their property. The seller can specify a time-based minimum price lower than their initial value. According to one embodiment, the system can re-evaluate any recognized offers against the new time-based minimum, and automatically update an offer status to accepted if appropriate. Further, based on seller input, the system can be configured to apply the deviation amount against any new time-based minimum. Thus, offers that originally would have been returned rejected, can be marked recognized later in the seller's timeline.

Under the transaction processing executed by the fsbo system 100, each offer receives a responsive status in real or near real time. For example, a buyer may receive an instant message or e-mail indicating that their offer for purchase has been accepted responsive to their submission of an offer. In some embodiments, the system 100 can include a communication module 116 configured to manage delivery of responsive communications to buyers. Further, the system can include a transaction module 112 that reconciles seller parameters against submitted offers to return an offer status. Offer status can include accepted, rejected, and recognized. Recognized offers are held by the system for seller consideration.

Once listings are generated (including, for example, a seller's passbook, seller's timeline, minimum price, video tour, etc.), the system enables potential buyers to search through available listings. In some embodiments, listings can be limited to serious buyers. Serious buyers can be qualified on the system by having a pre-approval from a lender for a mortgage amount. In some examples, buyer qualification can be limited to properties having a listing price within a system specified threshold of the buyer's pre-approval amount. In one example, a buyer can provide information on a down-payment amount available, and the system can limit the buyer's qualification to the pre-approval mortgage amount plus the down-payment amount.

In some embodiments, the system 100 and/or the listing module 110 is configured to provide search functions to users. Prospective buyers can search the system for listings by city, state, neighborhood, listing prices, bedrooms, square footage, and/or any other listing criteria. Additionally, licensees can search the listings for properties meeting a buyer's criteria and suggest properties of interest.

In some embodiments, the system and/or licensee can facilitate registered users becoming qualified buyers, seller, or both. For example, various lenders can be recommended on the system to a prospective buyer so they can become pre-approved for purchasing property. In some implementations, the recommended lenders can be specified by the licensee or by system selection. As discussed, pre-approval can be used by the system to filter displayed listings, or alternatively, all listings can be viewed but the system can be configured to limit offer submission to qualified buyers.

According to one embodiment, the system 100 can include a transaction module 112 configured to manage offer submission. The system 100 and/or transaction module 112 can be configured to display binding offer submission user interfaces. In one example, a potential buyer having reviewed the listings and associated seller's passbooks can submit an offer based on a displayed listing price. The system can be configured to accept offers below the listing price. Additionally, the system can also be configured to accept contingencies on the buyer offer. In some embodiments, the buyer can submit their own contingencies with their offer. For example, buyers may present offers contingent on a sale of their own home. Other contingencies including repairs of items on the inspection report, requests for items shown in the house, (e.g., curtains, light fixtures, etc.) can also be accepted by the system 100 and/or transaction module 112.

The system and/or support teams can recommend to such buyers that the buyer contact the seller to get an approval for any custom contingency. In some examples, the support team can request approval from the seller for the contingency. The system can evaluate contingencies submitted with offers against the seller's parameters. For example, the system can recognize contingencies input by the buyer that do not meet existing seller's parameters. Responsive to identifying non-approved contingencies, the system can notify the buyer and recommend obtaining seller approval. According to some embodiments, the system can provide messaging functions within the offer submission displays, specifically designed to communicate contingencies between buyers and sellers as needed.

The system can provide notifications to both sellers and buyers that all submitted offers are subject to financing contingencies. In some examples, the system is configured to notify all participants that accepting financing contingencies is a default setting. However, in some examples, a seller may specify that no contingencies will be accepted, including financing contingencies. In instances where the seller has approved specific contingencies in advance, the system can be configured to publish approved contingencies as part of the listing information. Alternatively, the seller may approve some contingencies in advance but not include approvals as part of the listing shown to potential buyers.

Once an offer is submitted, the system and/or transaction module 112 is configured to process the submitted offer against any defined seller parameters. Offers that do not meet the seller's parameters are rejected, and the buyer is notified by the system immediately. Offers that meet the seller's parameters are automatically accepted by the system, again notifying the buyer immediately. As discussed, various embodiments of the fsbo system (e.g., 100) are configured to process offers that do not meet the seller's parameters but are within an acceptable deviation. Alternatively, the system can also accept custom contingencies associated with a buyer's offer.

According to one embodiment, the system 100 and/or transaction module 112 is configured to process offers against seller's parameters to return three statuses: accepted, rejected, and recognized. For example, the recognized status is identified by the system for the offers that are below the seller's minimum but within the acceptable deviation, or for offers being at least within the acceptable deviation and including custom contingencies. The system maintains recognized offers for seller review. The seller can access the fsbo system to review and accept recognized offers during the offer acceptance period or by the conclusion of the offer acceptance period. In some examples, the system permits input of expiration dates from buyers limiting the time of their offers, thus in some instances seller acceptance on the system can be limited. In further example, buyer offers expired within a pre-defined period, and recognized offers that are not acted on, are automatically rejected in response to expiration of the pre-defined period.

According to some embodiments, the system is configured to elicit information for generating listings, pair users with support teams to facilitate preparation, marketing, and sale of listed property, qualify users, automatically processes purchase offers against seller criteria, and execute binding transactions upon offer acceptance. As discussed, the system provides a variety user interfaces to elicit information with respect to listings, offers, qualification, processing, facilitation, etc. According to some embodiments, the system can include a user interface module 114 that generates respective user interfaces through applications executing on users' computer systems (e.g., buyer, sellers, licensees, etc.). The user interface module 114 can be configured to accept and provide information to the system 100 and/or other modules (e.g., 106-112) to facilitate collection of information to execute described functions.

Figure 2:
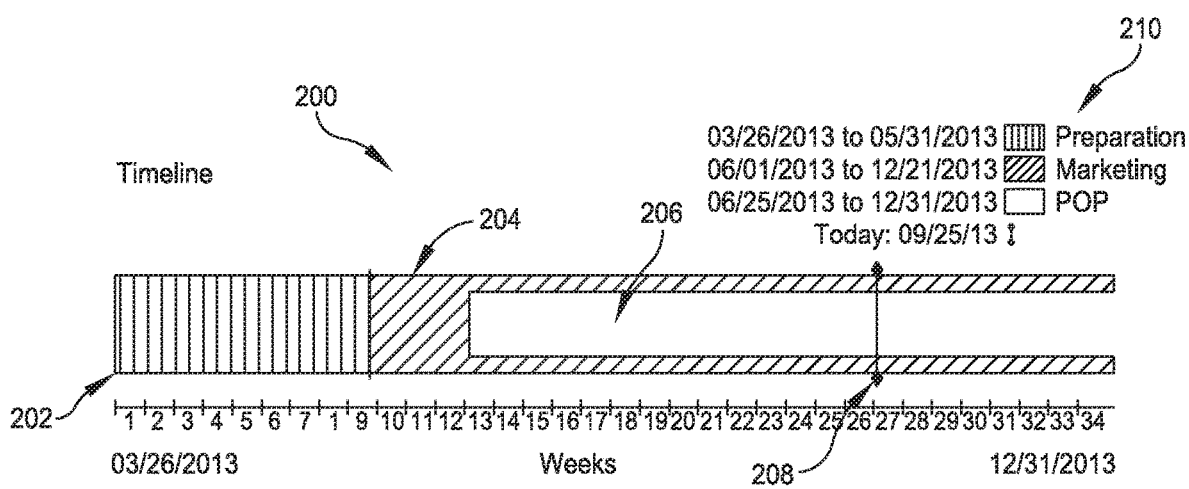
FIG. 2 is a screen capture of an example timeline display, according to one embodiment.

According to some embodiments, the system 100 and/or the user interface module 114 can be further configured to facilitate entry and visual organization of the data underlying the listing, preparation, offer submission, and sale of the property. In one example, the system generates and displays the seller's timeline in conjunction with a property listing. Shown in FIG. 2 is one embodiment of the seller timeline display 200. As shown, the seller's timeline display can include a visual display of a preparation period 202, marketing period 204, and offer acceptance period 206. The seller's timeline display generated by the system can also include a progression indicator 208, for example, to show potential buyers when to have their offers ready. The timeline 200 can include a legend 210 detailing the dates for each period and visual indicators associated with respective periods.

According to some embodiments, the seller's timeline increases buyer awareness and excitement over offer submission. According to some implementations, the seller's timeline is made available to potential buyers during the preparation period. Increasing buyer awareness during the preparation periods enables the fsbo system to increase awareness of pre-sale preparation activities, including, for example garage sales. According to some embodiments, the timeline can also be displayed with buyer notifications and/or system controls. In one embodiment, the timeline display can include timeline notes (not shown). The timeline notes can include recommendations by support teams "keep an eye on this one," or "great starter home." Some example functions can include—"add to watchlist." Responsive to adding a property to a watchlist, the system can notify the buyer of updated information, changes in the timeline, or transitions between periods on the timeline, and/or conclusion of time periods on the timeline. Other displayed functions can include "download the passbook," "view appraisal," among other options.

Returning to FIG. 1, the fsbo system 100 can also include a communication module 116. The system can manage communication between support teams, buyers, sellers, for example, using the communication module 116. As discussed, the system can be configured to deliver immediate responses to submitted offers. In one example, the communication module 116 manages offer status communication responsive to processing buyers' offers against the seller's parameters.

Once a purchase offer is accepted and communicated to the buyer, the system can prompt the buyer to complete a deposit to fulfill the offer/acceptance transaction. In some embodiments, the system 100 and/or transaction module 112 can include payment subsystems that manage user payments, including for example, payments from buyers upon receipt of an accepted offer. In some embodiments, the system requests a deposit from the buyer responsive to identifying an accepted offer. In further embodiments, the system can require the buyer present a deposit as part of submitting an offer. In some implementations, the system can be configured to require a deposit amount from buyers in order to grant a qualified status. Such deposits can be held in respective buyers accounts, that are automatically transferred to the seller responsive to the system determining an accepted offer. In further implementations, the system can pre-authorize a deposit amount from a buyer payment account, where the pre-authorized deposit amount is transferred automatically in response to an accepted offer.

The deposit can be used to secure the buyer's offer with the seller during the subsequent execution of any formal documents for transferring the property to the buyer. In some embodiments, the system facilitates execution of any offer documentation, purchase and sale agreements, rider inclusions/exclusions, etc. The support team assigned can provide assistance to the buyers and sellers during formal document execution. Depending on the system implementation, licensee implementation or direct access, the support team and/or system can provide licensee approved documents or system recommended documentation for completing the sale.

Figure 3A:
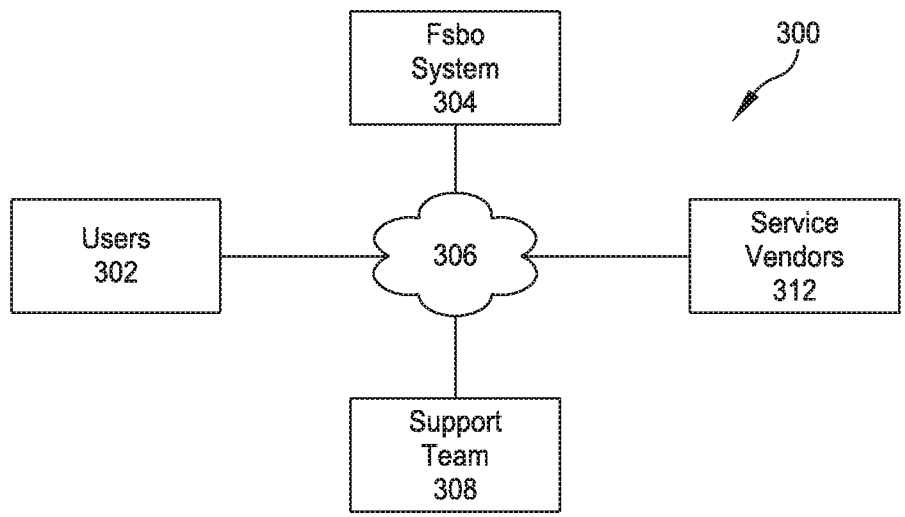
FIG. 3A is a block diagram of an example environment for the fsbo system, according to one embodiment.
Figure 3B:
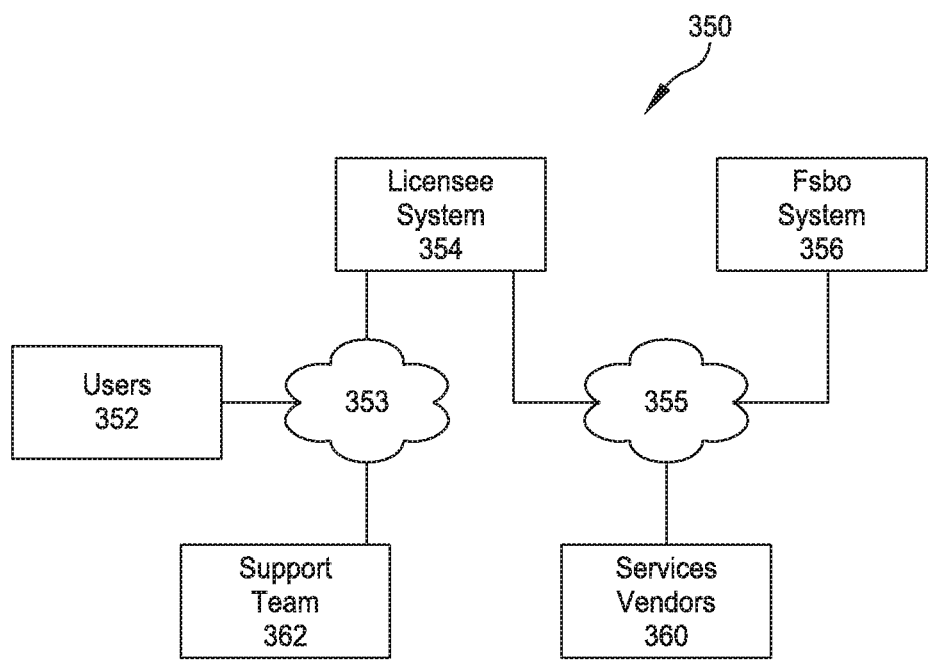
FIG. 3B is a block diagram of an example environment for the fsbo system, according to one embodiment.

Shown in FIG. 3A-B are example implementations of fsbo systems under a directly hosted model (300, FIG. 3A) and a licensee model (350 FIG. 3B). As shown in FIG. 3A, users 302 (e.g., buyers, sellers, etc.) can access the fsbo system 304 which can include, for example fsbo system 100 and the described system modules of FIG. 1, over a computer network 304. The system 306 is configured to assign support teams 308 to users as they register for the fsbo system. Both sellers and buyers can be assigned support teams that facilitate listing property, matching buyers and sellers, and facilitating the execution of the purchase transaction. The support team can be connected to the system 304 directly and/or can access the system 304 through a communication network 306 remotely. The fsbo system 304 and/or the support team 308 can connect third party service vendors 312 and their respective web presences to streamline the property sales process. In one example, the system and/or support team can recommend mortgage lenders to buyer so they may become qualified buyers. In another example, the system and/or the support team can recommend appraisers to the home seller so they can create qualified listings. According to one embodiment, the system can connect a multitude of vendors with users of the system to help prepare property for sale. In one example, the system recommended vendors can include home appraisers, home inspectors, staging professional, cosmetic services, insurance reviewers, etc. According to another embodiment, the system can present filter lists of vendor or vendors recommendation, for example, by a licensee.

Shown in FIG. 3B, is a licensee based environment 350 that enables users 352 to access a fsbo system 356 through a licensee system 354. The users 352 can connect to the licensee system via a communication network 353, and the licensee system can connect to the fsbo system 356 via network 355. According to one embodiment, a difference between the direct model and the licensee model is that the support team is assigned from licensee personnel, either by the fsbo system or by the licensee system. In one example, the fsbo system 356 can request information from the licensee system 354 to assign a support team 362 to a registered user.

Additionally in the licensee model, multiple licensees can access the fsbo system 356, and each user and/or listing generated through a respective licensee can be tagged or associated with the respective licensee. In some settings, the system can filter property listing results based on licensee information, and further can limit recommended vendors (e.g., service vendors 360) to those approved by respective licensees. In some implementations connections between users and service vendors 360 can be managed at the licensee system 354. Connections to licensee service vendors 360 can proceed through system 354 over network 355, for example. According to some embodiments, networks 353 and 355 illustrated as separate networks can comprise the same network, alternatively, network 353 and 355 can include separate network connection between elements of system 350.

The licensee architecture can also be implemented as a SAAS (Software as a Service) or fully automated software system configured to transact real estate online. For example, the fsbo SAAS accessed through the licensee can manage creating a listing through the acceptance of an offer to purchase. The fsbo SAAS can also provide for deposit transactions to secure accepted offers, among other options.

Figure 4:
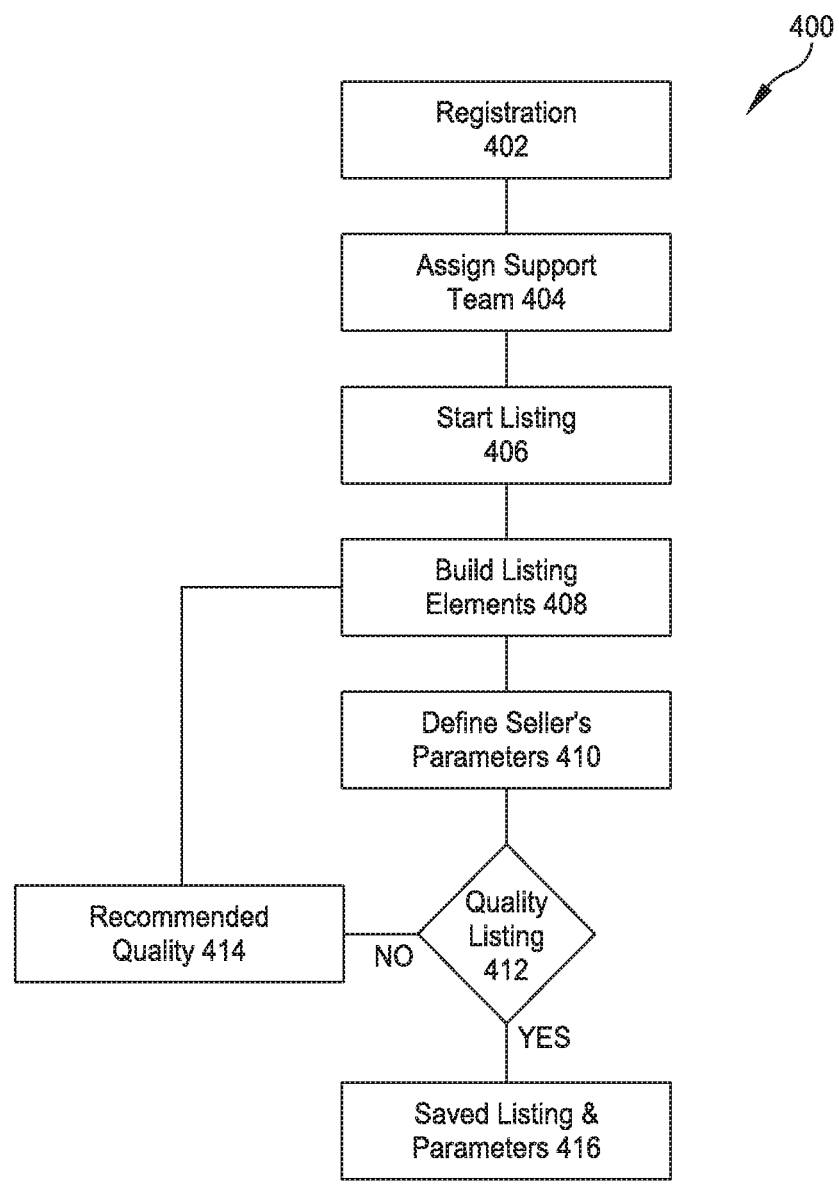
FIG. 4 is an example process flow for generating a listing by a new user, according to one embodiment.

Regardless of the system model, various embodiments of the fsbo system (e.g., 100, 300, 350) can execute similar processes to register users, qualify users, and process offers for purchase to automatically return an offer status in response to submission. Shown in FIG. 4 is an example process 400 for generating a listing by a new user. Process 400 begins at 402 with registration of the new user. Registration typically involves capturing demographic information on the new user (e.g., address, employment, etc.) and the creation of a respective user account to maintain the user's information. In some examples, each user and/or account can be linked with a licensee, and the licensee information stored as part of the user account data. At 404, the new user can be assigned a support team. In one example, the system assigns the support team based on a direct access model at 404. In another example, a support team can be assigned by a licensee system or through a query executed on a licensee system. Once the new user has registered at 402, the new user can begin with the creation of a listing at 406. In some embodiments, assignment of a support team can occur after the user has determined what activities they wish to use (e.g., sell a property, create a listing, view property listings to purchase, etc.). In some examples, the assignment of the support team occurs as a background process, without the user's awareness, for example, as they navigate a fsbo system.

At 408, the user wishing to sell a property begins building their listing. The building of the listing at 408 can include multiple interactions between a seller, their support team, and third party vendors. According to one embodiment, the listing building step at 408 elicits details on the seller's property and seller's parameters at 410 under which the seller is willing to accept a purchase offer. Further, at 408 the seller can establish their timeline for the sale. For example, the seller can provide a preparation period to prepare their property for sale, obtain an appraisal, inspection report, perform a walkthrough with their support team, execute a staging plan, identify cosmetic issues to resolve, etc.

In some embodiments, the seller can also create a seller's timeline specifying a time period for marketing their property, and a period during which the seller will accept offers to purchase. In addition to defining a timeline, steps 408-410 can include a variety of actions and/or sub-processes, for example, the listing creation processes discussed below with respect to FIG. 7 can also be executed as part of steps 408-410. In various embodiments, steps 408-410 can be executed over multiple sessions at different times. As discussed in greater detail below, various executions of steps 408-410 can elicit a large volume of information on the property to be sold and establish any constraints the seller has on selling the property (including for example, minimum price, listing price, deviation amount, acceptable contingencies, etc.). According to one aspect, the fsbo system is configured to connect serious sellers with serious buyers. As part of process 400, the generated listing is evaluated to determine if the listing is qualified or the seller is a serious seller. For example, at 412 the listing is evaluated to determine if qualified. Both support teams and embodiments of the fsbo system can provide information on how to become qualified.

According to one embodiment, qualification of a listing is dependent upon whether an appraisal has been performed on the property for sale. Additionally, step 412 can evaluate any appraisal information to determine if the appraisal was issued by a certified appraiser or to ensure the appraisal was performed recently (e.g., within the last 6 months). If there is no appraisal information or the appraisal is too old 412 NO, the seller receives recommendation to get their property appraised at 414. The recommendations can include links to local certified appraisers, system recommended appraisers, licensee recommendation appraisers, among other examples. Process 400 can continue with building the listing at 408 and 410 to include the appraisal. Evaluation of a listing with a valid appraisal follows 412 YES, and results in the listing and the seller's parameters being stored with a qualified status at 416.

Additional qualifications can be evaluated at 412, including for example, credit scores associated with the seller, evaluating a listing price against the appraised value to determine the listing price is within a percent variation, etc. According to some implementations, licensee support teams can be given the authority to qualify a listing that has not met such enhanced criteria.

Figure 5:
FIG. 5 is an example process flow for submitting offers on listed properties by a new user, according to one embodiment.

Once qualified listings are generated and stored, the listings can be searched by registered buyers. Shown in FIG. 5 is an example process 500 for submitting offers on listed properties by a new user. Process 500 begins at 502 with registration of the new user. Registration typically involves capturing demographic information on the new user (e.g., address, employment, etc.) and the creation of a respective user account to maintain the user's information. In some examples, each user and/or account can be linked with a licensee, and the licensee information stored as part of the user account data. At 504, the new user can be assigned a support team. In one example, the system assigns the support team based on a direct access model at 504. In another example, a support team can be assigned by a licensee system or through a query executed on a licensee system. Once the new user has registered at 502, the new user can be qualified at 506. In some embodiments, assignment of a support team can occur after the user has begun qualification, but in some embodiments, the user is assigned a support team that can guide the buyer through obtaining qualification.

According to one embodiment, qualification of the buyer at 506 includes obtaining a mortgage pre-approval from an authorized lender up to a lender specified amount. As is known, getting pre-approved typically means that the buyer has supplied the mortgage lender with information on income, assets, and liabilities, and the lender has checked and verified that information. In some examples, pre-approval includes credit checks and credit worthiness by the lender. At 506, the buyer can submit a pre-approval letter, and the letter can be validated. In one example, the lender must be an approved lender. An fsbo system and/or a support team can provide referrals to approved lenders for buyer qualification.

In some embodiments, additional qualification criteria can be required, for example at 506. In one implementation, a minimum buyer credit score can be required for qualification. In another example, the buyer must demonstrate availability of a deposit amount to be qualified. The buyer can include credit card information or other payment account information against which a deposit amount can be pre-authorized. According to one embodiment, in the event the buyer submits an accepted offer, the deposit amount can be immediately transferred.

Once a potential buyer is registered and qualified, process 500 continues with searching for desired properties at 508. The buyer may access a user interface to input search criteria to find property they wish to review. In some embodiments, the support team can facilitate creation of search criteria and/or provide interesting listings to the buyer based on their preferences. Additionally, the support team can provide recommendations to the buyer based on their pre-approved mortgage amount, available down payment, etc. Once properties have been identified the buyer can review any information on the properties through their computer system at 510.

At a minimum, the reviewed listings include a listing price and a seller's passbook which is a collection of pertinent information on the property. The collection can include any one or more of: a listing sheet, a description of the seller's parameters, the seller's timeline (e.g., as a visual display with a progression indicator), a professional appraisal report, a professional home inspection report, and a disclosure statement as well as other related documents and property information. Having reviewed one or more listings the buyer can create an offer to purchase which is submitted at 512. In some examples, the seller provides information on acceptable contingencies. Typically, fsbo systems by default allow financing contingencies on all submitted offers. In some examples, a seller may not accept financing contingencies.

According to some embodiments, the buyer may submit an offer that is below the listing price and process 500 continues with returning information on the offer status almost immediately at 514. Offer status can be returned at 514 in real time or near real time. The returned offer status can include accepted, rejected, and recognized. Offers that meet the seller's parameters (e.g., minimum price—which can be at, above, or below the listing price) can be immediately accepted. Offers that include custom contingencies can be evaluated against the seller's parameters. In some examples, natural language processing can be executed against buyer input contingencies, so that buyer contingencies entered as natural language can be evaluated. If the seller has not approved any contingencies, submission of a contingency with an offer that meets the minimum price results in the offer being "recognized." Further, offers below the minimum but within a deviation can also elicit a return status of recognized. Offers not meeting the sellers parameters, or the sellers expanded recognized parameters will be returned with a rejected status.

Figure 6:
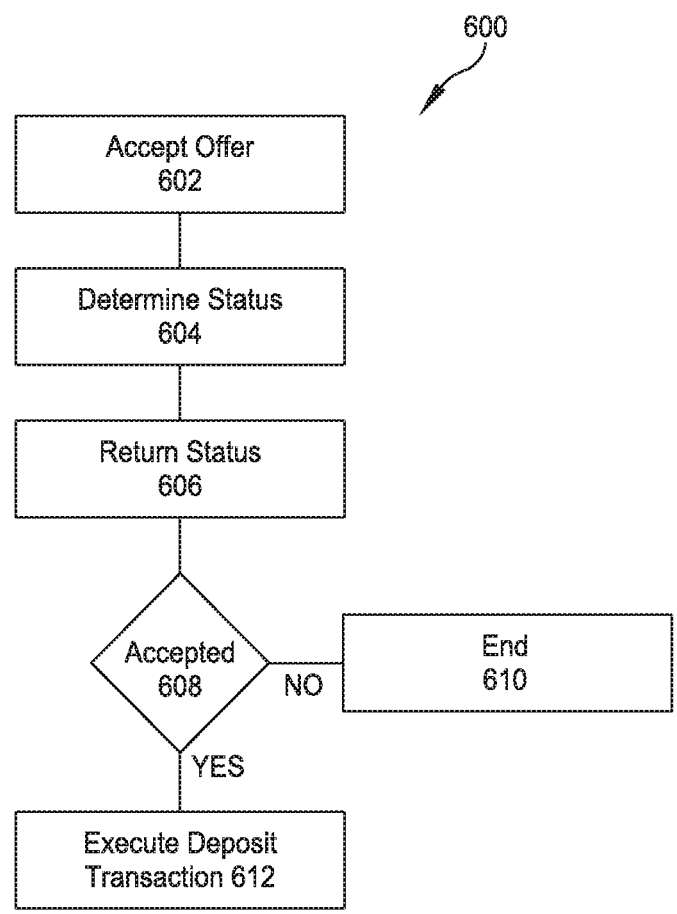
FIG. 6 is an example process flow for evaluating an offer, according to one embodiment.
Figure 7A:
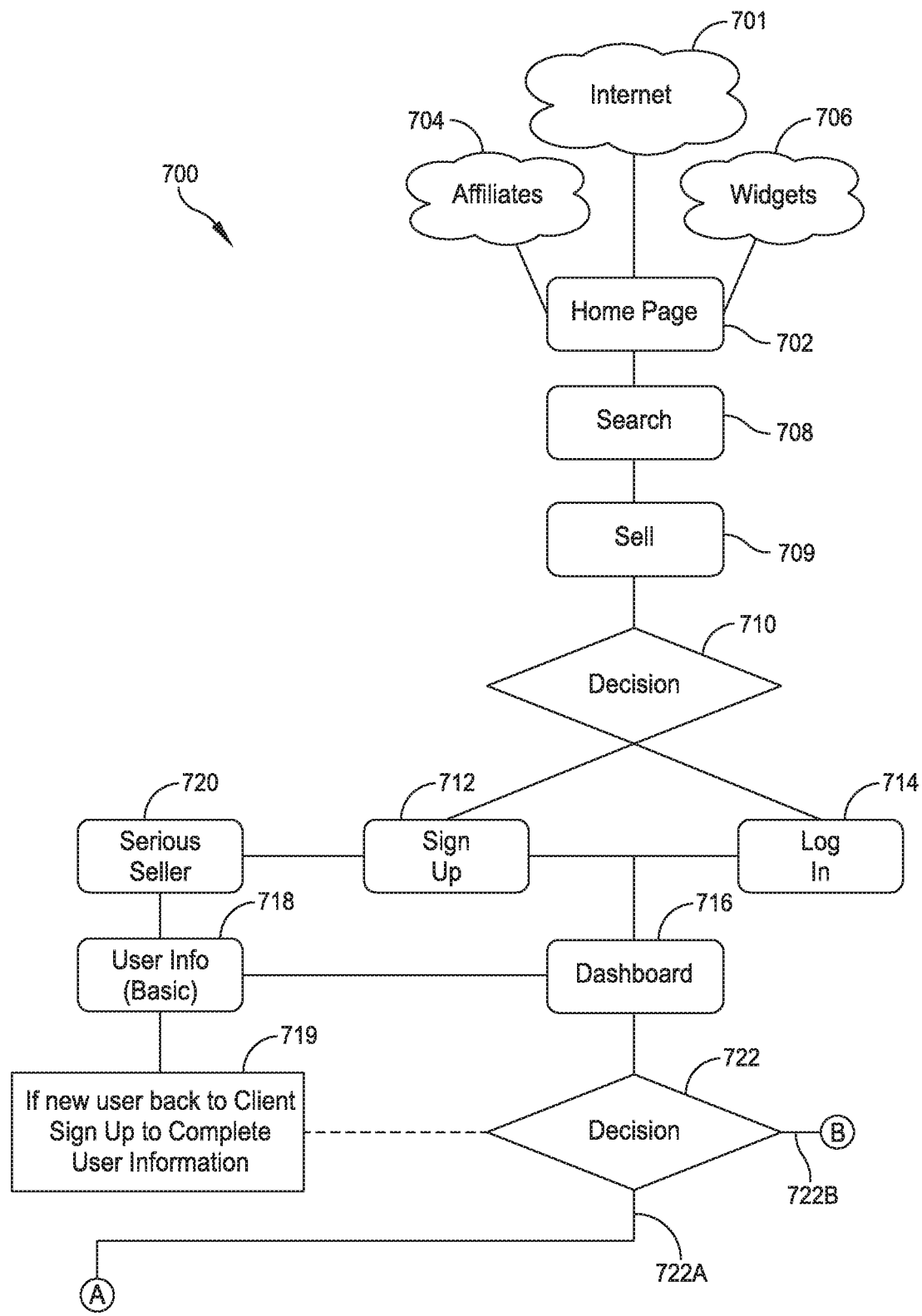
Figure 7B:
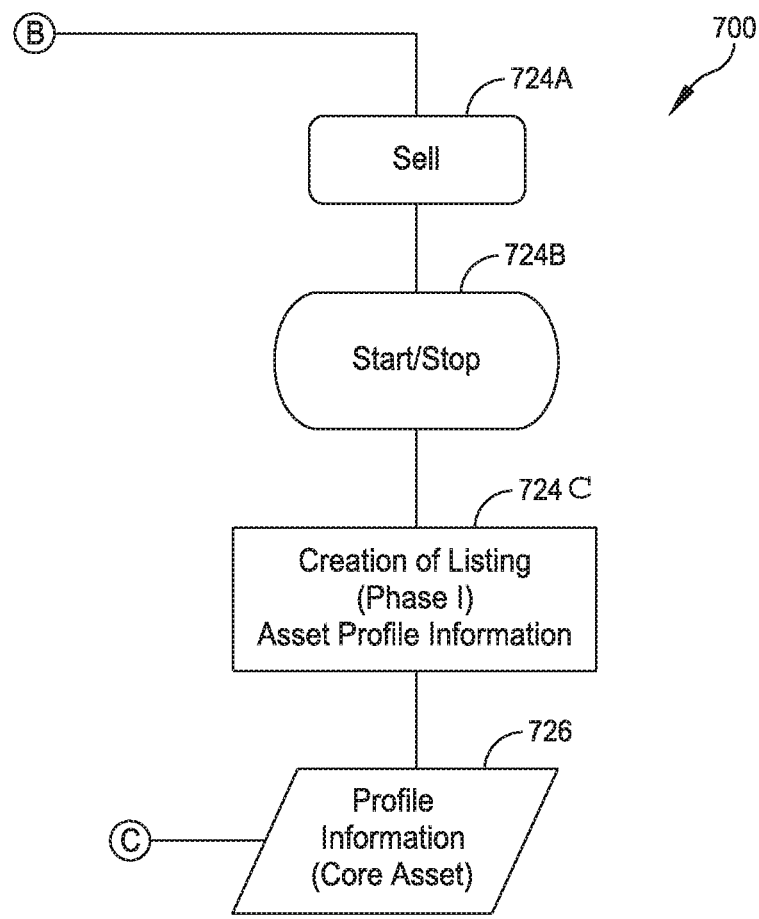
Figure 7D:
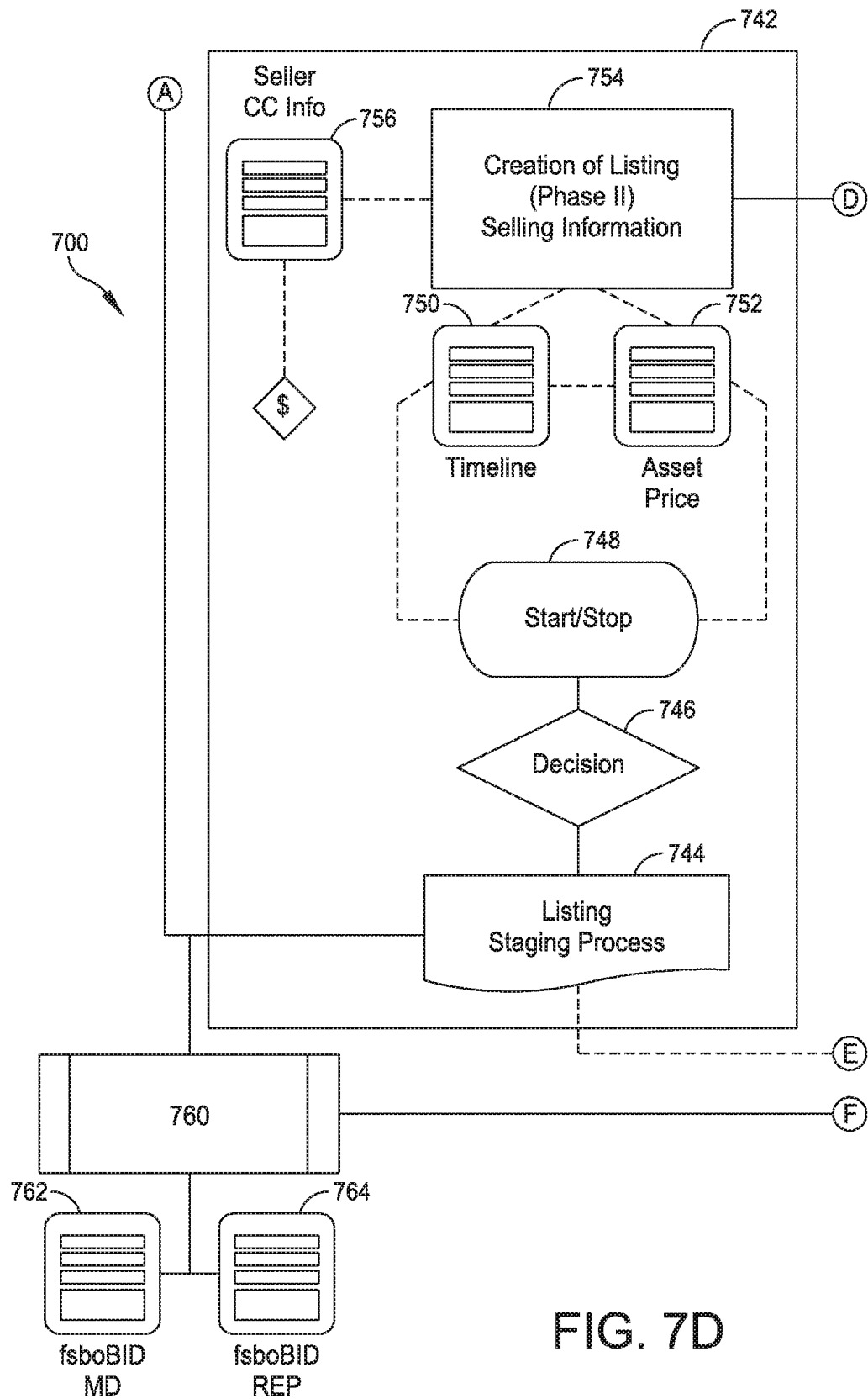
Figure 7E:
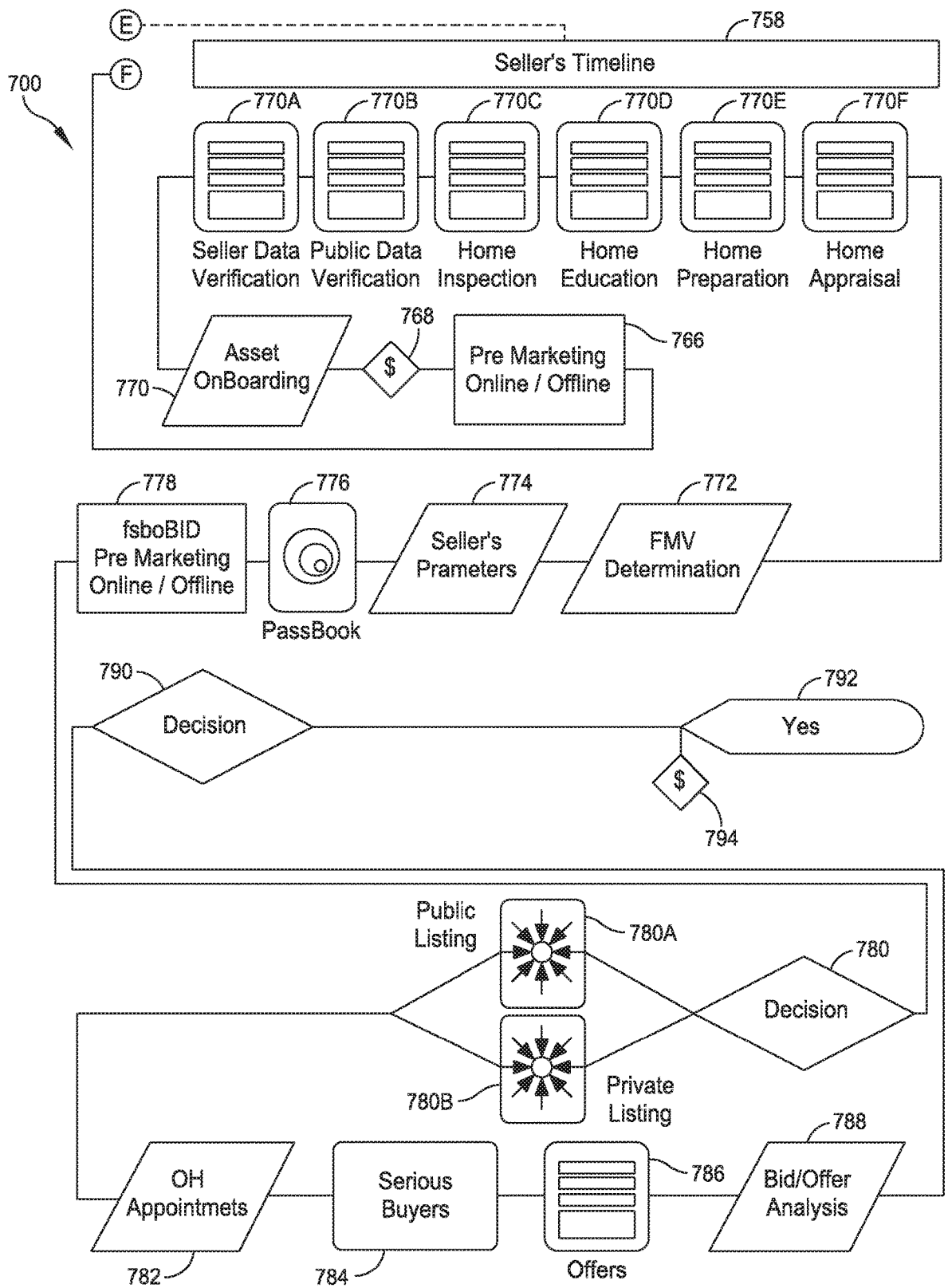

According to some embodiments, return of offer status to the buyer at 514 can include execution of one or more sub-processes or functions to evaluate a submitted offer against seller parameters. Shown in FIG. 6 is an example process 600 for evaluating an offer. Process 600 beings at 602 with the submission of an offer by a potential buyer. Typically, the buyer has obtained a qualified status via execution of other processes. At 604, the offer is evaluated to determine an appropriate status automatically. For example, at 604 a set of system based rules can be executed based on existing seller parameters and the submitted offer. In some examples, the submitted offers undergo pre-processing to translate a submitted offer into terms that can be evaluated against seller parameters (e.g., custom contingencies can be processed according to natural language processing rules). Evaluation (including for example, execution of processing rules) returns an accepted status at 606 for offers meeting the seller's parameters. Offer's not explicitly meeting the seller's parameters can return a rejected status or a recognized status. Sellers may define at least two levels of acceptable offers: meeting the first level triggers automatic acceptance by the system, while the second level allows the seller to further consider the offer. If the offer does not meet any level of acceptable offer, the buyer receives a return status of rejected at 606. Process 600 can end at 610 if the offer is rejected or recognized 608 NO.

Process 600 may optionally continue at 608 YES for accepted offers. According to one embodiment, process 600 can include execution of a deposit transaction at 612 for accepted offers. In some examples, the deposit transaction can proceed automatically in response to receiving an accepted status. In other examples, the buyer receiving an accepted status is prompted to execute a deposit transaction in order to maintain their offer.

Not shown in FIG. 6 are additional implementations wherein recognized offers can be re-evaluated over a seller's timeline. If a seller has defined time-based seller's parameters (e.g., reduced minimum price towards the end of the offer acceptance period) a recognized offer can be automatically accepted in response to evaluation against the time-based parameters. The change in status can result in execution of the deposit transaction similar to 612.

According to some embodiments, the process 600 can be executed in a different ordering of steps, and in some examples may consolidate the execution of one or more steps. Further, process 600 is illustrated according to one ordering, is some embodiments, one or more of the steps described can be executed concurrently. Various embodiments of a fsbo system can executed any of the processes (e.g., 400, 500, and 600) individual steps describes in the processes and various combination of the steps described.

Example FSBO Environment and FSBO Embodiments

Some example environments that can execute any one or more of the steps described with respect to processes 400, 500, and 600 are discussed in greater detail below. Additionally, further details and options are discussed with respect to the example environments and embodiments that be and are applied to various implementation of fsbo systems and processing execution. As used to describe various embodiments, the fsbo system includes implementations of a web-based, multi-media platform to market, buy, and sell real property without a broker and can include the various methods and processes implemented on that platform to enable such marketing, buying and selling of real property. In certain instances, and where the context indicates, the term "fsbo system" may also be used to refer to the computer system and the company that provides or supports the fsbo platform. As used herein, "fsbo" is an acronym for "For Sale By Owner" and the system implements various functions and processes employed using the internet or any other type of network access and to match serious buyers with serious sellers without a commissioned broker/agent.

According to one aspect, the fsbo system and/or platform matches serious sellers and serious buyers in an environment that infuses confidence, stability and professionalism in support of a cost effective approach to the sale of residential real estate. It should be appreciated that although the fsbo platform described herein is primarily directed to residential real estate, it should be appreciated that the present invention is not so limited, and various embodiments may be used with bank-owned real estate, and with commercial real estate. The system and methods described herein may be modified for use with property other than real estate (e.g., real property), such as for use with personal property such as automobiles, boats, jewelry, and the like.

According to some embodiments, "fsbo systems"'s blend the human touch of a support team with the technological elements of automatic processing of offers, immediate offer status updates, user qualification, and systematic management of listing and sale of property. Unlike the traditional broker/agent model, in one embodiment members of the support team are full time employees of the entity hosting the fsbo system, who receive a competitive salary and benefits. The support team (including for example, a fsbo-REP) assists the seller via the fsbo system in preparing and marketing the home. Together the seller and the fsbo-REP organize the seller's passbook, for the benefit of the buyer. All serious buyers are provided a copy of the seller's passbook in advance of the offer period.

According to some embodiments, the seller's passbook is a collection of pertinent information such as the listing sheet, a description of the seller's parameters, the seller's timeline, a professional appraisal report, a professional home inspection report, a disclosure statement and other related documents. The fsbo system supports the seller in benchmarking the listing price of a home to the Fair Market Value (FMV) as determined by the appraisal. The seller's passbook can be organized on the system for the benefit of both the seller and buyer and can include a collection of pertinent information regarding the seller's home.

In one embodiment, the passbook provides a personal letter from the seller to the buyer, a description of the fsbo process, an understanding of the seller's parameters, the seller's timeline, a listing sheet, a home operating budget, a professional appraisal report, a professional home inspection report, a disclosure statement, a sample bid sheet, a plot plan, a tax bill, floor plans (where available), a community profile report, an explanation of what to expect after a buyer's offer is accepted and directions to the house for sale. Never before has the buyer been presented with so much detailed information. The seller's passbook provides the buyer with confidence and encourages a fair market price based on factual information and not the biases of a broker or the unrealistic expectations of a seller.

In addition to the hands on support of the fsbo-REP or support team, the fsbo system is also configured to provide instruction, recommend actions, identify vendors, and manage the timeline for execution. According to another aspect, through embodiments of the fsbo system users are able to establish a fixed cost to convey real estate. Unlike conventional real estate broker models that demand a commission based on the sales price of the home, the fsbo model is a flat fixed cost. For example, the total fsbo cost to the seller of a 500,000 home is approximately an order of magnitude less than the cost of a similarly priced home sold using a real estate broker. The total fixed fsbo cost to the seller of the $500,000 home may be approximately $2,500 (excluding service fees), whereas the identical home sold using a real estate broker would typically cost the seller a standard 5% commission or $25,000. The savings to the seller are even more dramatic for homes with a higher value.

Thus, according to some implementations the fsbo model reduces the cost of conveying real estate, and ensures both the seller and buyer are in complete control to allow for the free market exchange of information and ideas.

Direct Access Model Environment Definitions

As used to describe the direct access model environment, the following terms are defined as follows:

Appraisal

The process of determining the market value of real property. In one embodiment, Appraisal reports conform to the Uniform Standards of Professional Appraisal Practice (USPAP) and to the principles of appraisal practice, code of ethics, and discipline-specific standards adopted by the American Society of Appraisers. The one who conducts an appraisal is called an Appraiser.

Offer Protocol

Various fsbo system embodiments use the internet and are configured to execute proprietary software to process buyer's offers and evaluate the offer against pre-determined seller parameters.

fsbo-MD

An example member of a support team. The fsbo-MD (fsbo Marketing Designer) is a trained professional and is the face of fsbo. In one embodiment, the fsbo-MD creates the cosmetic report and staging report for the benefit of the Homeseller.

fsbo-REP

An example member of a support team. The fsbo-REP is the leader of the team and serves as the liaison to the seller. In one embodiment, the fsbo-REP is responsible for assisting the seller in organizing and compiling all the information for the seller's passbook.

OH—Open House

Is an example service providing a method of showing a home for sale. Traditionally an open house (OH) is hosted on a designated day and time, for example on Sunday from 11 am-2 pm. More recently home owners are producing videos and posting it to virtual tour sites, including for example, OHanytime.TV and YouTube. This approach is more time efficient and secure, allowing the seller to make appointments with perspective buyers to control who tours the home through the system. In some examples, the system can automatically schedule such virtual tours without seller interaction. Further, the system can automatically scheduled home tours. For example, the seller can specify time periods for house visits on the system, and interested buyers request and schedule an appointed through the system automatically. In some embodiments, the fsbo system can include modules to manage open house scheduling and, for example, listing on web pages. Additionally, local resources for home services can be displayed with home listings to provide contextually relevant services to viewing with each listing.

Percentage Variation

An optional component of the seller's parameters. This feature allows the seller to pre-determine an acceptable percentage difference or lower ACCEPTANCE price. In some embodiments, all buyers' offers within the Percentage Variation are RECOGNIZED and are to be reviewed by the seller.

Proprietary Offer Protocol

Software that grants serious buyers the ability to make secured, private offers/bids via the internet for listed homes on the fsbo platform website.

Seller's Parameters

A sales number, which can be generated from knowledge of the FMV, that sets the price boundary or minimum limit the Home seller will accept using the fsbo system. This approach is uniquely different and is advantageous for both the buyer and seller.

Seller's Timeline

Visual elements incorporated into various embodiments of the fsbo system. In one embodiment, the timeline is posted to the fsbo website and is updated regularly. It benchmarks the Preparation Period, the Marketing Period and Bid Acceptance Period. It creates heightened awareness and bidder excitement.

Serious Buyer

A buyer that is pre-approved for the mortgage. Optionally the buyer has received a documented Bidder # from the fsbo platform's website (e.g., iGOfsbo.com). In some embodiments, buyers are qualified to become "serious buyers" via submission of lender documentation of pre-approval.

Serious Seller

A registered seller of the fsbo platform's website (e.g., iGOfsbo.com). This type of seller values the marketing advantage of employing a proprietary offer protocol and website as a cost effective approach to convey real estate.

Various implementations of the fsbo model employ technology, a team of trained professionals (human touch), the internet, and best practices to effectively promote a home. In one example, the fsbo process commences when a seller registers with the fsbo system to market their home and to accept online bids. The seller interacts with the system to create the seller's passbook, for the benefit of the serious buyer. A serious buyer is not a tire kicker. By participating (end for example, qualifying on) the fsbo system the buyer has been pre-approved for a mortgage and will buy what they want, when they see it. The seller's passbook is a unique tool that provides the serious buyer with all the information they'll need to make an informed offer. In accordance with one embodiment, the content of the seller's passbook can include two professional evaluations of the home for sale (e.g., an appraisal and an inspection), the seller's timeline, and further valued information. All serious buyers can receive or view a copy of the seller's passbook prior to the initiation of the offer process.

The entity hosting the fsbo system supports the platform and the entities' personnel (e.g., support team) supports the buyer and seller. This unique alignment eliminates conventional commission based model typically imposed on sellers and buyers. Third party influence of the self-serving broker/agent model is removed from the sales transaction and the system restores the control of conveying residential real estate to the buyer and seller. An aspect of the present disclosure is to provide support to both the seller and buyer without any suggestion of a "conflict of interest."

According to another aspect, the fsbo system builds, supports and maintains the relationship between a seller and buyer throughout the sales process, and removes emotions and facilitates execution of property sales.

Various embodiments provide various advantages, including any one or more of the following features:
1. The fsbo system works with and matches serious sellers and serious buyers
2. The fsbo system offers a cost effective approach fixed fee approach—the seller or buyer never pay a commission
3. The fsbo model enables the seller and buyer to be in complete control
4. The fsbo system works without supporting commissioned brokers/agents
5. The fsbo system establishes the seller's timeline. Property does not go stale
6. The fsbo system promotes the creation of the seller's passbook
7. The fsbo system blends technology, and manages interaction with a support team to put the consumer first
8. The fsbo system assists in identifying the seller's pre-determined sale parameters
9. The fsbo system execute an offer protocol, configured to provide immediate offer status return
10. The fsbo system process provides transparency, with privacy for the buyer and seller
11. The fsbo system promotes scheduling and conducting of open houses (OH) by appointment only (both real world and virtual)—for the safety and convenience of the seller In one embodiment, the fsbo platform provides the seller and buyer with any one or more the following:

At Home Consultation with a professional Marketing Designer (fsbo-MD)
Personally assigned support team
Complimentary video "How to Sell/Buy with fsbo" educational DVD
Cosmetic Report
Staging Report by accredited staging professional
Videographer with professional Voice-over narration
Professional Editor to finalize video production
Seller passbook
Comprehensive Loss Underwriting Exchange (Clue) Report—if applicable
Independent Professional Inspection & Full Report
Independent Professional Appraisal & Full Report
Disclosure Statement
Seller timeline—predefined marketing schedule
Seller parameters
Home operating budget
Floor plan of seller's home—if available
Signage for yard
QR Coding—Quick Response code
Superior technology platform—seller Timeline, Offer protocol, Software
Marketing Material—flyers, postcards, listing sheet and organizing binder
Response center for perspective buyer
Home Listing on fsbo platform's website (e.g., iGOfsbo.com), licensee, and associated web presences
Home Listing on, for example, OHanytime.TV or myopenhouseanytime.com—or other marketing video website
Confirm appointments for scheduled home showings
Listing additionally sited on Facebook, Twitter, Zillow, and Google
Work with serious buyers only—all buyers are pre-approved and screened
Negotiation Services—Proprietary Offer Protocol It should be appreciated that various embodiments can implement any combination of the above features, and that in certain embodiments, one or more of the above-identified features may be omitted.

Example Implementations of the fsbo Process

Figure 10:
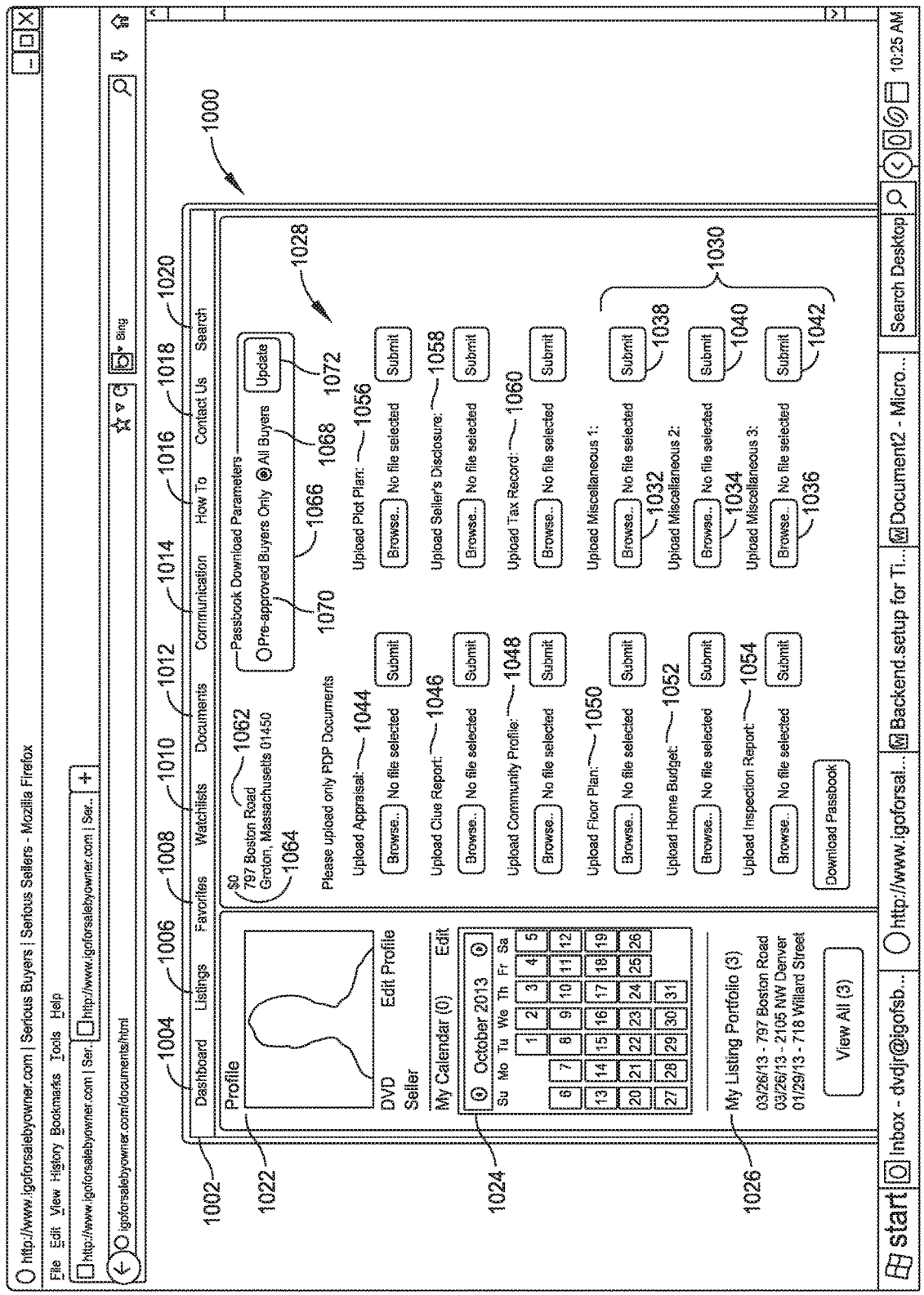
FIG. 10 is a screen capture of an example dashboard display.

According to one aspect, the fsbo model is uniquely different and remarkably satisfies the needs of both the buyer and seller. In response to a seller registering online with fsbo, the seller is assigned a designated fsbo-REP (a.k.a. team leader). The fsbo-REP helps coordinate and organize the marketing efforts with the seller. Shown in FIG. 7 is a flow diagram 700 of a web-based, multimedia platform to market, buy, and sell real property from the perspective of a seller. The process 700 begins with access to a home page at 702 over the internet 701. The home page can include affiliate information via web links 704 and web functionality (i.e., widgets 706) that provide access to home services useful to potential users. The site provides functions to search 708 and sell 709 property. At 710, users reach a decision point based on registration status, where new users can sign up 712 or existing users can login to the system 714 to a dashboard display 716 (e.g., an example dashboard user interface is shown in FIG. 10).

According to some embodiments, the dashboard 714 provides a control panel for the registered users (e.g., buyers or sellers) to access system functionality throughout the site. FIG. 10 illustrates an example screen capture of a user interface 1000 of a dashboard display for managing documents provided by an fsbo system. According to one embodiment, a user can access the dashboard at any time and from anywhere on the website to access all the tools and easily navigate their way around the website. Further, dashboard displays can be tailored to the user viewing the fsbo system (e.g., sellers, buyer, licensees, administrator, etc.).

Sign up 712 of new users can include capture of basic user information 718 entered into the dashboard display. Entry of user information can occur over multiple sign-ins 719. User information, for example, entered at 718 can also include information to establish a seller as a serious seller at 720. From the dashboard at 716, users can access listing creation functions (e.g., Phase I Property Information Entry —724A-C and Phase II—Selling Information/Staging—742). In some examples, where the user has not yet entered basic information, the process 700 can return the user to basic information input screens to capture demographic information on the user.

Process 700 can continue with phase I 722(A) or phase II 722(B) depending on user selection and/or whether the user is returning to complete other phases. Phase I concerns entry of asset information. At 724A, the user has elected to create a seller's listing. The user can start and stop listing creation at 724B as needed, during the listing creation phase, e.g., at 724C (phase I).

Listing creation can include multiple groupings of information on the property to be sold. According to one embodiment, process 700 can proceed with definition of a property profile having multiple elements. The property profile can include core information 726. The core information can include any one or more of: home detail 726A; home appearance information 726B; home lot description 726C; home rooms specification 726D (including, e.g., number, size, etc.); home bathrooms 726E; home school district 726F; home tax information 726G; and home utility expenses 726H. The property profile can include feature information at 728. The feature information can include any one or more of: home style description 728A; home construction information 728B; home exterior features 728C; home foundation information 728D; home parking detail 728E; garage information 728F; roof detail 728G; and description of home utilities/appliances 728H. The property profile can also include amenity information 730. The amenity information 730 can include any one or more of: home zoning 730A; home frontage 730B; home exterior views 730C; home school specifics 730D; home tax information 730E; home area amenities 730F; home additions 740G; and any home remodel information 730H. Process 700 can proceed with entry of any of the profile information (e.g., core information 726A-H, feature information 728A-H, and/or amenity information 730A-H).

According to another embodiment, the property profile can also multimedia information 732 for the home. For example, multimedia information can include home photos 734, for example, illustrating any of the previous information entered. The multimedia information 730 can also include video of the home 736, including for example, home video tours that can be presented via a virtual tour service (e.g., OH Anytime 738).

Once property profile information is entered process 700 can proceed with creation of selling information at 742. According to some embodiments, users may enter some information and return to the data entry at various times. For example, process 700 includes start/stop block 740 to illustrate the user's capability to begin and stop phase I and alternatively, to switch between phase I and phase II at will. At 742, the seller can specify information regarding the details of a prospective sale. Phase II can include listing the property and staging of the property for sale 744. The parameters under which the seller wishes to offer the property include subjective decisions 746 on behalf of the seller. Such decisions can be facilitated by the support team, and informed by home inspections, home appraisals, etc. Phase II can optionally include partial execution, i.e., start/stop block 748, where the seller establishes some information and returns to complete the listing information, including for example, a seller's timeline 750, a listing price 752, which can be the sellers minimum acceptable price, and the seller can specify a separate minimum acceptable price. In some examples, the seller can define acceptable deviations to establish offers that are not rejected but saved for further evaluation. Once the seller's parameters are set the creation of the listing 754 is ready for searching by prospective buyers. As part of listing creation, various third party services can be required. In some embodiments, sellers may be required to pay for service in advance of listing generation and/or as part of listing generation, thus seller's payment information can be captured, for example, at 756 (e.g., sellers credit card information is submitted).

Concurrent with listing generation, the seller's timeline for preparing their property and a time period for accepting offers on their property is established, as shown by block 758. The fsbo support team 760 (e.g., fsbo-MD 762 and fsboREP 764) facilitates the user's entry of the property profile information and creation of the seller's listing. According to some embodiments, listing creation (e.g., phase I and phase II) can include pre-marketing activity facilitated by the support team. Pre-marketing activity can occur online and offline 766 (including for example, home staging activities involving seller expenditures 768). The marketing activity can include web site listing in addition to the fsbo listings, signage for the property, etc. Process 700 can include asset onboarding activities 770 (including e.g., seller data verification 770A; public data verification 770B; home inspection 770C; seller education 770D; home preparation 770E; and home appraisal 770F). The home appraisal can be basis for a fair market value determination on the property 772, which facilitates the definition of the seller's parameters 774 (including for example, timeline 750 and listing price 752). The seller's parameters and the data on the property can be stored as part of a seller's passbook 776 which can be used to further augment pre-marketing 778. Generation of a listing can include a decision 780 on whether the listing should be public 780A or private 780B. If video tours were created, marketing procedures can include virtual tour appointments 782, which can be limited to serious buyers 784 who may submit offers 786 to received offer status responsive to automatic analysis at 788 of the offer and seller's parameters (e.g., 774). At 790, an offer status will be determined (e.g., accepted, rejected, and recognized). If accepted 792, process 700 can conclude will a deposit payment by the buyer at 794.

According to some implementations, a first goal of the fsbo-REP is to schedule an appointment for a home visit from a fsbo trained Marketing Designer called the fsbo-MD. The fsbo-MD is a member of the seller's marketing team and reports to the fsbo-REP. In advance of the fsbo-MD's home visit the seller receives a fsbo organizing marketing binder and a copy of the professionally produced "How to Sell/Buy with fsbo" educational DVD. Other materials may also be provided.

At a first of one or more planned home visits, the fsbo-MD completes a thorough walk through of the home, and begins to assist the seller in preparing the home for sale. At this meeting the fsbo-MD takes still photos, and makes an inventory of the home, both of which will be used by the fsbo-MD to produce a cosmetic report and staging report. These reports are prepared for the benefit of the seller. The reports make recommendations on how a seller can make their home more attractive for a buyer. The fsbo-MD returns for a second visit at the end of the Preparation Period to produce a marketing video to be uploaded to both the fsbo platform website (e.g., iGOfsbo.com) and a real property open house website, such as OHanytime.TV (a web service that permits home buyer to take a virtual tour of a property at any time from the comfort of their own home or office). The fsbo-MD works in concert with the fsbo-REP team leader and the fsbo-REP team leader works with the seller from registration to the acceptance of an offer.

The fsbo-REP team leader is the seller's liaison and is responsible for organizing and compiling all the information for the seller's passbook. The seller's passbook is designed to address all the questions a buyer may have about a prospective property. Strengths and weaknesses of the home are revealed to help the buyer conclude this home is right for them and the fair price they will offer.

The seller's passbook can include a description of the fsbo process, the seller's timeline, a home listing flyer, a capital improvement worksheet, a home operating budget, a home repair worksheet, floor plans, an independent professional appraisal report, an independent professional inspection report, the disclosure statement and directions to the property. The seller's passbook can be organized for the benefit of both the seller and buyer. The seller's passbook can include a collection of pertinent information regarding the seller's home. In one embodiment, the book offers a personal letter from the seller to the buyer, a description of the fsbo process, an understanding of the seller's parameters, the seller's timeline, a listing sheet, a home operating budget, a professional appraisal report, a professional home inspection report, a disclosure statement, a sample bid sheet, a plot plan, a tax bill, floor plans (if available), a community profile report, an explanation of what to expect after a buyer's offer is accepted and directions to the house for sale. Other embodiments can include different information. The seller's passbook provides the buyer with confidence and encourages a fair market price based on factual information and not the biases of a broker.

The fsbo-REP may also order the yard sign, post the listing on fsbo's dynamic website, and continue to be available to assist the seller in marketing their home. The fsbo-REP and seller work closely together throughout the fsbo process to the acceptance of a buyer offer. The fsbo-REP also works with serious buyers to help identify a home for sale. Unlike the traditional broker's model, the fsbo-REP is neither expensive nor a middleman. The role of the fsbo-REP is to support the buyer through the process of purchasing a home. The fsbo-REP answers any questions and makes referrals when requested. Each pre-approved registered buyer receives a private Bidder # and a complimentary copy of the seller's passbook in advance of the offer acceptance period. The seller's passbook empowers the buyer to make an educated offer on the property that matches their desired needs and financial abilities.

According to one embodiment, the fsbo model with the support of the seller's passbook, the seller's parameters, the seller's timeline, the fsbo-REP team and the fsbo proprietary offer protocol satisfies the needs of both the seller and buyer without the added expense of a broker. The fsbo-REP is not paid a commission hence the fsbo-REP can focus on what is truly important—servicing the needs of the buyer and the seller and making matches that happen. The fsbo system facilitates private offer submissions made, for example, via the internet between the buyer and seller. All buyers are privy to the fair market value (FMV) of the home through the appraisal included in the listing, but never know what other buyers are offering.

The offer protocol executed by the fsbo system evaluates buyer offers per the seller's pre-determined parameters automatically. In one embodiment, once an offer is submitted the buyer receives an instant message regarding their offer status. Executing offer analysis via system criteria removes emotions from an emotional transaction. It is a simple quantitative analysis performed by the system execution process. According to some executions, the buyer will have no material contingencies because any identified concerns have been addressed prior to making the offer. Further, the receipt of an instant message instills a heightened excitement for instant gratification, which may further induce a buyer to make an offer.

Figure 8:
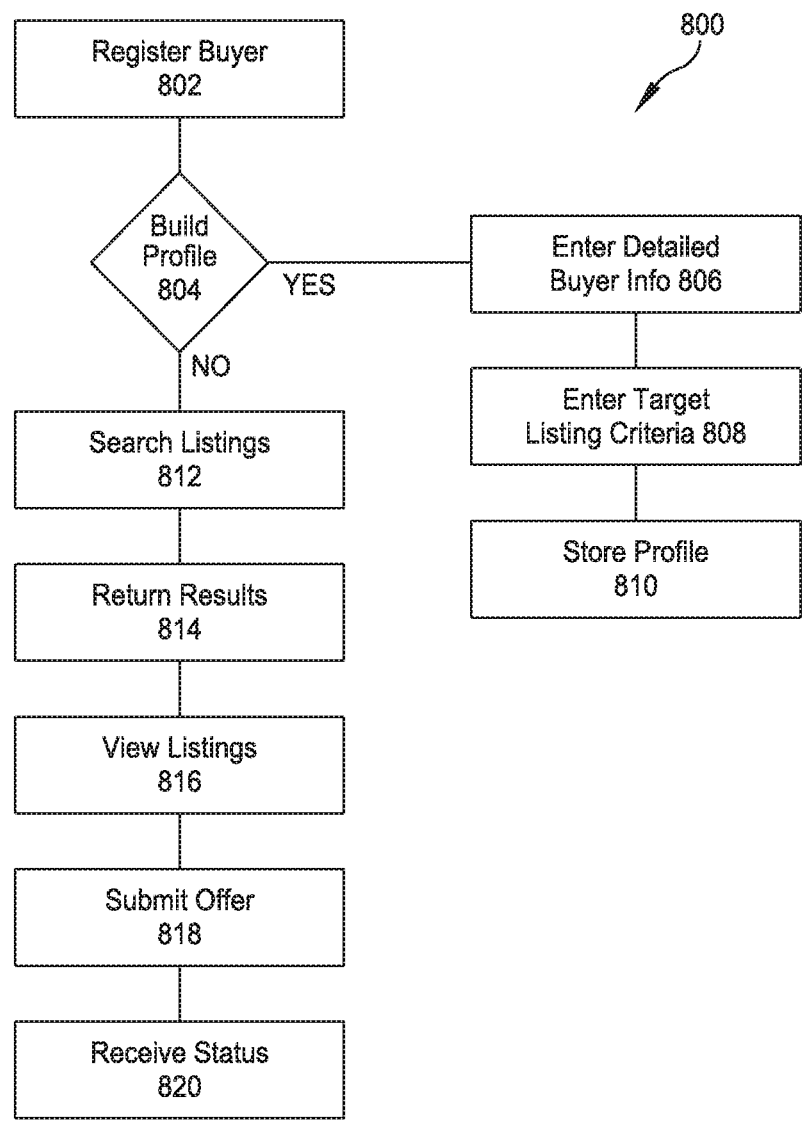
FIG. 8 is a flow diagram of a web-based, multimedia platform to market, buy, and sell real property from the perspective of a buyer in accordance with an embodiment of the present invention.

Shown in FIG. 8 is a flow diagram 800 of a web-based, multimedia platform to market, buy, and sell real property from the perspective of a buyer in accordance with one embodiment. Flow 800 begins at 802 with registering a buyer over the Internet. Flow 800 continues at 804 with a request to build a buyer profile. If the buyer wishes to build their profile 804 YES, the buyer enters detail information at 806. The detailed information can include employment information, work history, credit information, credit score, salary, address, home phone, work phone, etc. In some embodiments, entry of detailed information at 806 can also include input of pre-approval for a mortgage and the amount of the pre-approval. In one example, the buyer can be asked to submit a pre-approval letter from a lender at 806. After entering detailed information at 806, the buyer can specify target listing criteria at 808 (e.g., price range, target price, location, district, square feet, yard size, etc.). The target listing criteria can include any specification of information available on a property accessible through the fsbo system. The buyer's profile can be stored at 810. In some embodiments, the buyer's detailed information is used (e.g., by a fsbo system) to automatically generate target listing criteria. For example, a maximum price can be suggested based on salary and/or available down payment.

The target listing information can be used to execute searches at 812. Additionally or alternatively, search can be executed at 812 based on user input, where the user input can come from buyers with and without profiles. At 814, search results are returned for viewing in detail at 816. If the buyer wishes to purchase a property, the buyer can submit an offer at 818, which can be below a current asking price. The offer is automatically processed and the buyer received an offer status in return almost immediately at 820. The offer status can include accepted, rejected, and recognized.

According to additional aspects, eliminating the realtors allows the buyer and seller to truly control the transaction. There is no interference of a third party or the realtor's self-serving interest to make a sale and get paid a commission. In accordance with one embodiment, there is no set closing time in the bidding process at which offers are evaluated; an offer is accepted as soon as it satisfies the pre-determined parameters set by the seller. For example, a buyer could make an acceptable offer in the first twenty minutes of the offer process and consequently the offer process is closed and the property will only accept backup offers. This characteristic of the offer process encourages buyers to submit their best offer or risk losing the opportunity to purchase their new home.

Figure 9:
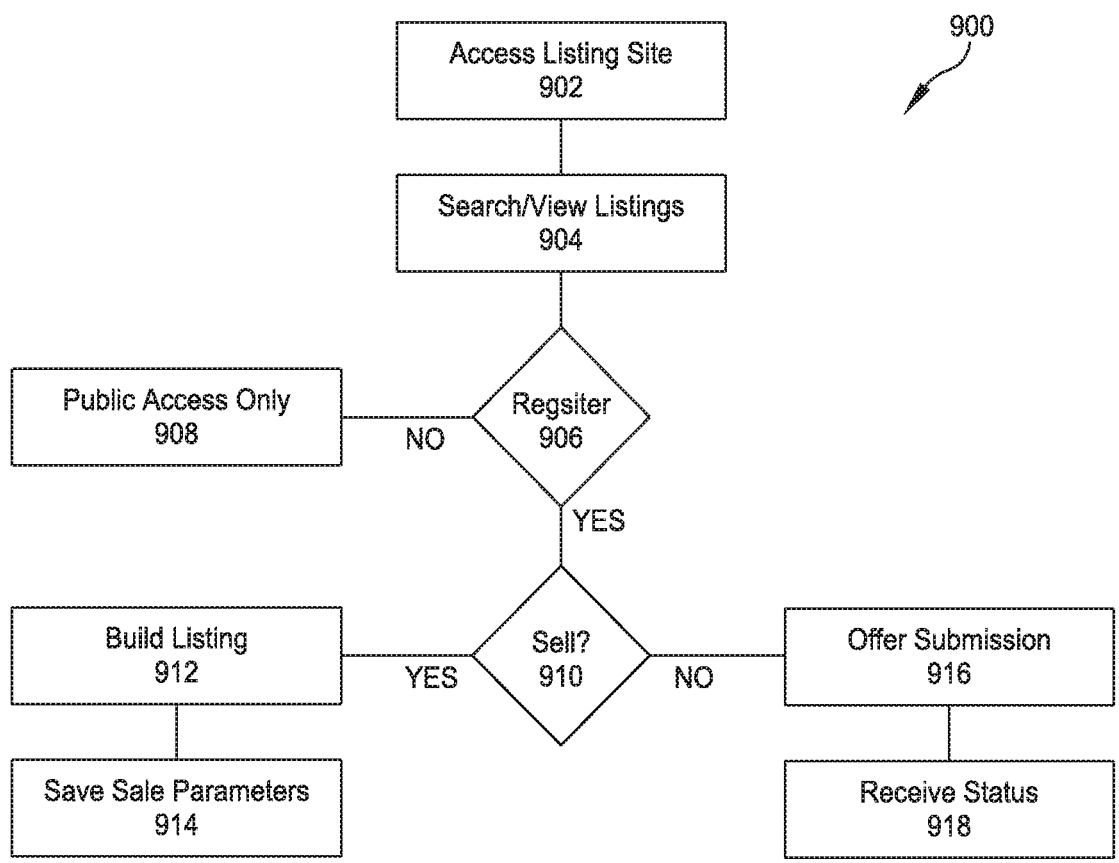
FIG. 9 is a flow diagram of processing on a multimedia platform to market, buy, and sell real property in accordance with one embodiment.

FIG. 9 illustrates an example process flow 900 for listing properties for sale and processing offers against properties.

Flow 900 begins at 902 with users accessing the listing site. The listing site may be accessed directly on a hosting system, including for example, a cloud based presence. Additionally, the listing site can be access through licensee system (e.g., shown in FIG. 3B). In some examples, the licensee system may direct users to listing systems, execute functionality locally, for example, to provide information from listing systems and/or software, or provide other configuration and architectures to pass through users, data, offers, and/or acceptances. In some embodiments, users accessing the listing site can search and view existing listings, for example, at 904. In some examples, only public listings are viewable by unregisters users. In other examples, listing detail is limited to registered users.

Users wishing to view filtered content can received a request to register at 906. If the user does not register 906 NO, the user can still access public material at 908. If the user registers 906 YES, than the user can be given access to any material, if any, that prompted the registration request. Flow 900 can continue with identification of a transaction activity the registered user wishes to perform. For example, if the user wishes sell property 910 YES, than the user can build their listing at 912 and have the listing details and their sale parameters saved at 914 for searching by prospective buyers. Steps 912 and 914 can include a number of sub-processes and additional steps (not shown). For example, the various functions, steps, and actions discussed with respect to FIG. 7 and creating a listing can be incorporated into the execution of 912-914.

If the user does not wish to sell 910 NO, the user may search property listing to identify properties they wish to purchase. The buyer can create and submit a offer to purchase on identified property at 916. Received offers are processed and an offer status is returned automatically at 918 indicating acceptance, rejection, or that the offer needs further consideration. Steps 916 and 918 can include a number of sub-processes and additional steps (not shown). For example, the various functions, steps, and actions discussed with respect to FIG. 7 specifically offer submission and processing can be incorporated into the execution of 916-918. Additionally, the various functions, steps, and actions discussed with respect to FIG. 8 and offer submission and processing can be executed as part of 916-918.

Various user interfaces can support the execution of processing on the fsbo system and/or facilitate entry of data associated with listing generation and processing offers for sale. Shown in FIG. 10 is an example user interface 1000 for managing listing documents. At 1002 is a menu header portion configured to navigate between displays and functions on the fsbo system. According to one embodiment, the menu header include selections for dashboard 1004—for accessing management functions; listings 1006—for accessing listings; favorites 1008—for recently or frequently accessed information; watchlists 1010—for properties selected for the watchlist; documents 1012—to manage documents uploaded to the fsbo system or downloaded for viewing; communication 1014—for accessing communication functions between users and/or support teams; how to 1016—for instructions on use of the fsbo system; contact us 1018, and search 1020—to access searching functions within the fsbo system.

According to one embodiment, display 1000 includes information pertaining to the current user, which can include a profile portion 1022, a calendar 1024 (e.g., showing scheduled walkthroughs, property visits, schedule appoints for property staging, upcoming offer periods, etc.), and a listing portfolio 1026 displaying properties being sold by the user.

In further embodiments, display 1000 can include a passbook creation portion 1028. The passbook creation portion is configured to display functions for including any documentation on the user's property. In one example, a plurality of documents can be submitted for inclusion in the seller's passbook. The display can provide functions for uploading the plurality of documents, including miscellaneous documents not pre-defined on the system (e.g., at 1030, the user can browse for miscellaneous documents 1, 2, and 3 (1032, 1034, and 1036) and submit any such documents by selecting 1038, 1040, and 1042. The user interface can also include selections for capturing and uploading pre-defined documents (e.g., Appraisal 1044; CLUE Report 1046; Community Profile 1048; Floor Plan 1050; Home Budget 1052; Inspection Report 1054; Plot Plan 1056; Seller's Disclosure 1058; and Tax Record 1060. According to some embodiments, the only required document is the appraisal, which can be required to qualify the property listing.

In some examples, the display 1000 includes an indicator of the property on which the passbook is being organized at 1062 and any seller parameter specified for the property (e.g., $0 at 1064). Sellers may limit access to the seller's passbook for any listing. Shown at 1066 is a control for defining passbook download parameters. In one example, the control 1066 can include radio buttons for selecting whether the passbook is available to all buyers at 1068 or limited to pre-approved buyers only at 1070. To save any changes to the access criteria the user can select 1072.

In further embodiments, the user interface displays can be tailored to the specific user accessing the fsbo system. Further examples can include additional functionality. In some user interfaces messaging functions are provided (e.g., mailbox functions can be provided for communicating with a support team, receiving offer notifications, etc.).

Figure 11:
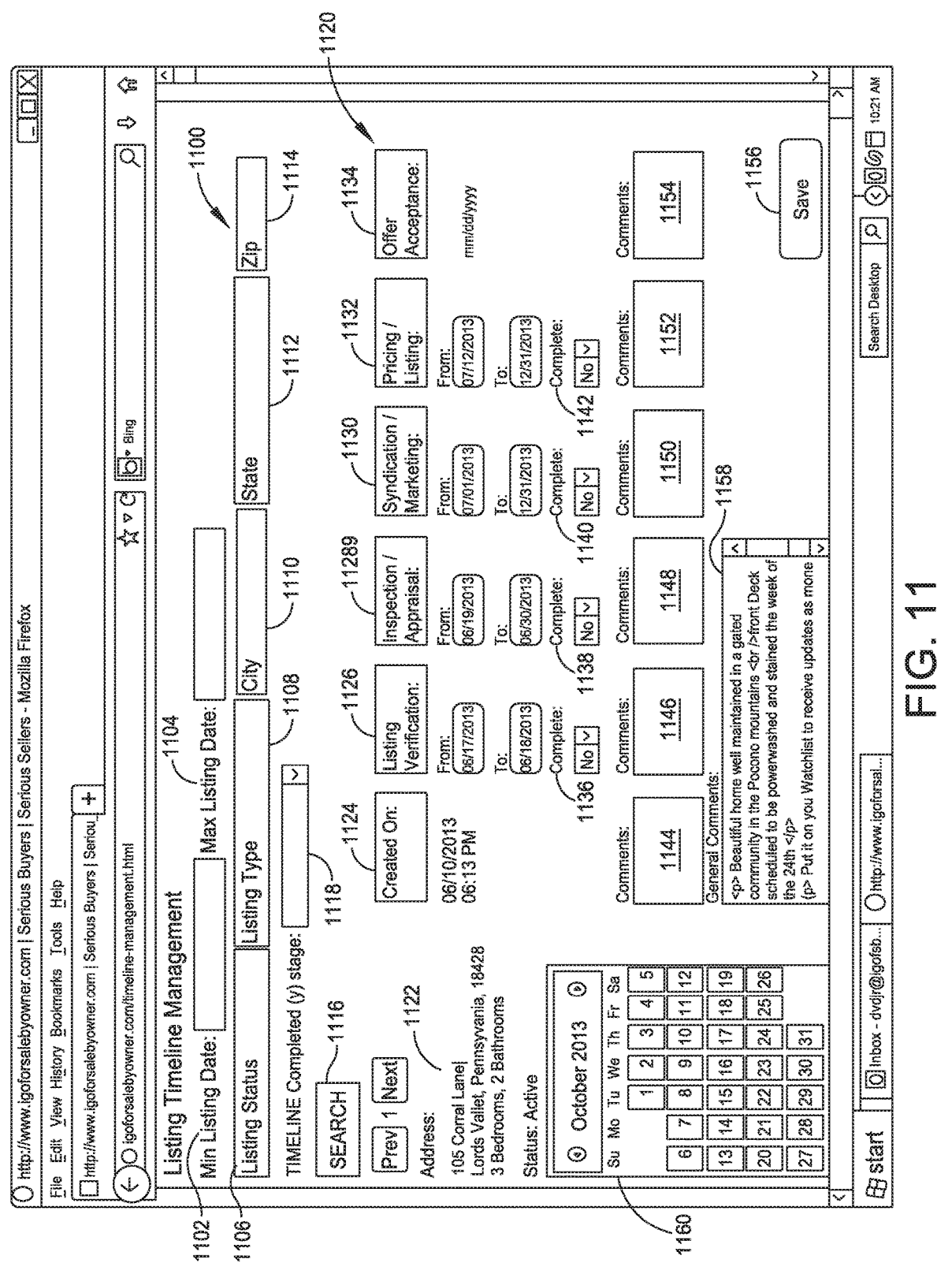

Shown in FIG. 11 is an example user interface 1100 for managing a seller's timeline. A user can input a minimum listing date 1102 and maximum listing date 1104 for any property, listing status 1106, listing type 1108, city 1110, state 1112, and/or zip 1114 to search for timelines that are associated with the user. Once the search criteria is entered the user may selected "search" at 1116 to return a set of results. Additionally the user can search for associated timelines based on a stage of completion via dropdown listing 1118. Details on the property and timeline will be displayed at 1120. In one example, a property and timeline is identified by property address at 1122. Any details for an existing timeline are displayed to the user (e.g., created on: and associated dates at 1124; listing verification and associated dates at 1126; inspection/appraisal and associated dates at 1128; syndication/marketing and associated dates at 1130; pricing/listing and associated dates at 1132; and Offer acceptance and associates date(s) at 1134). Each period and/or detailed information that requires seller or third party vendor action can optionally include a status drop down to detail whether or not the seller or third party vendor action is complete (e.g., at 1136-1142). Each period and/or detailed information for the timeline can also optionally include a comments section for storing comments (e.g., at 1144-1154). After update, the user can save any changes by selecting "save" at 1156. In some embodiments, the display can include a text box for incorporating general comments on a listing (e.g., timeline notes at 1158). Additional display can include a calendar at 1160, which can help the user define timeline periods.

Figure 12:
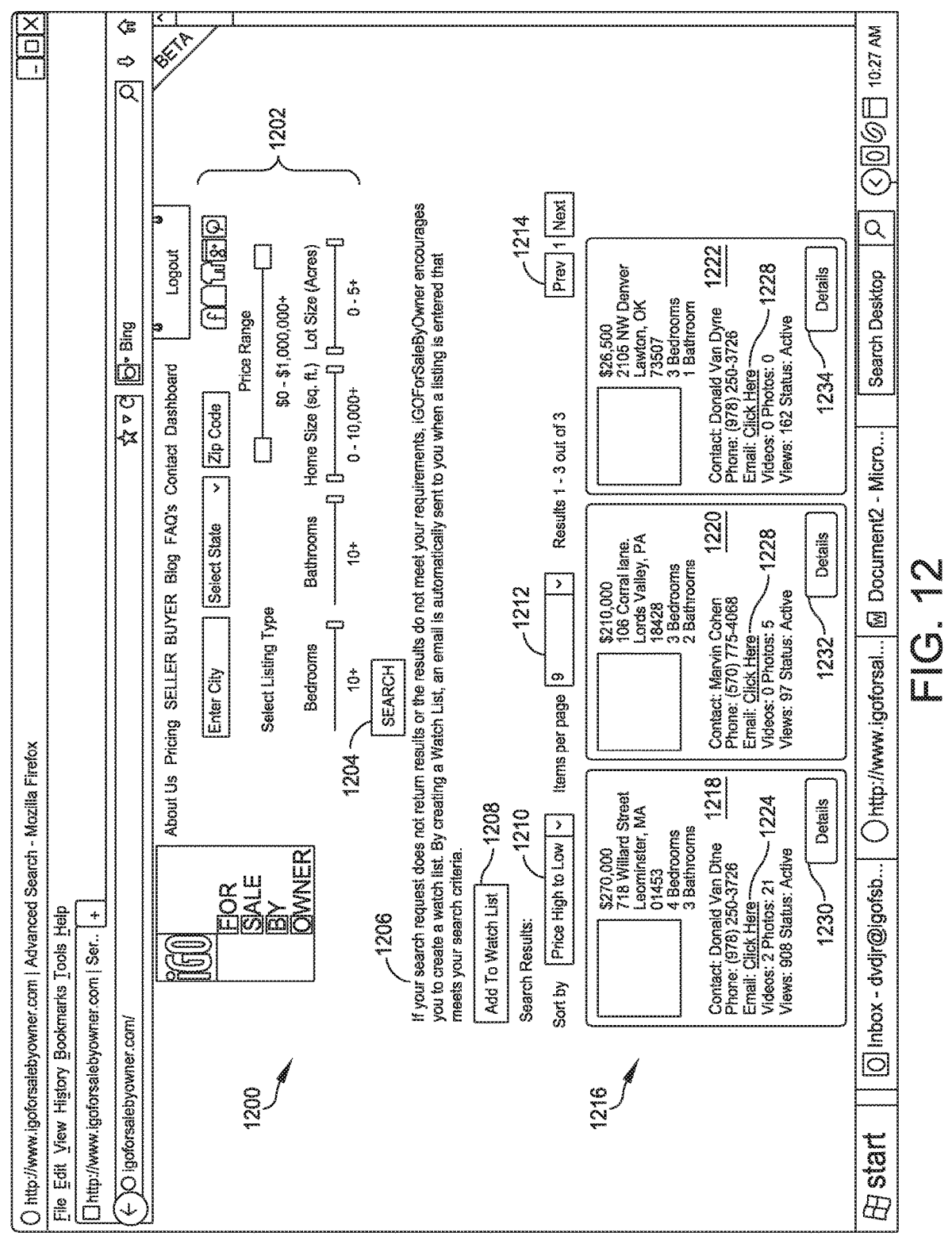

Shown in FIG. 12 is an example user interface 1200 that can be presented by a fsbo system to allow users to enter search criteria and receive property listings as results. A user can detail search criteria at 1202, including for example, city, state, zip, listing type, price range, bedrooms by number, bathrooms by number, home size, property lot size, etc. Once criteria has been entered, the user may execute the search by selecting 1204 "SEARCH." The system can provide messages to users through user interface 1200, for example, at 1206. The system can provide information on functions available to registered users to provide incentive to register, and/or use such features including used of the "add to watch list" function at 1208 and automatic e-mail notification described. The user interface 1200 can include tools for filtering displayed results. For example, the user can sort results based on price using drop-down 1210, change a number of displayed properties at 1212. Additionally, the user can scroll through pages of results at 1214 as necessary. Shown in section 1216 are the first three results returned. Each result provides some detail on the property, and can include contact information for the seller or seller's support team should any questions need to be answered (e.g., at 1224-1228). Additionally, each listing can include links to additional detail on the respective property at 1230-1234.

Figure 13A2:
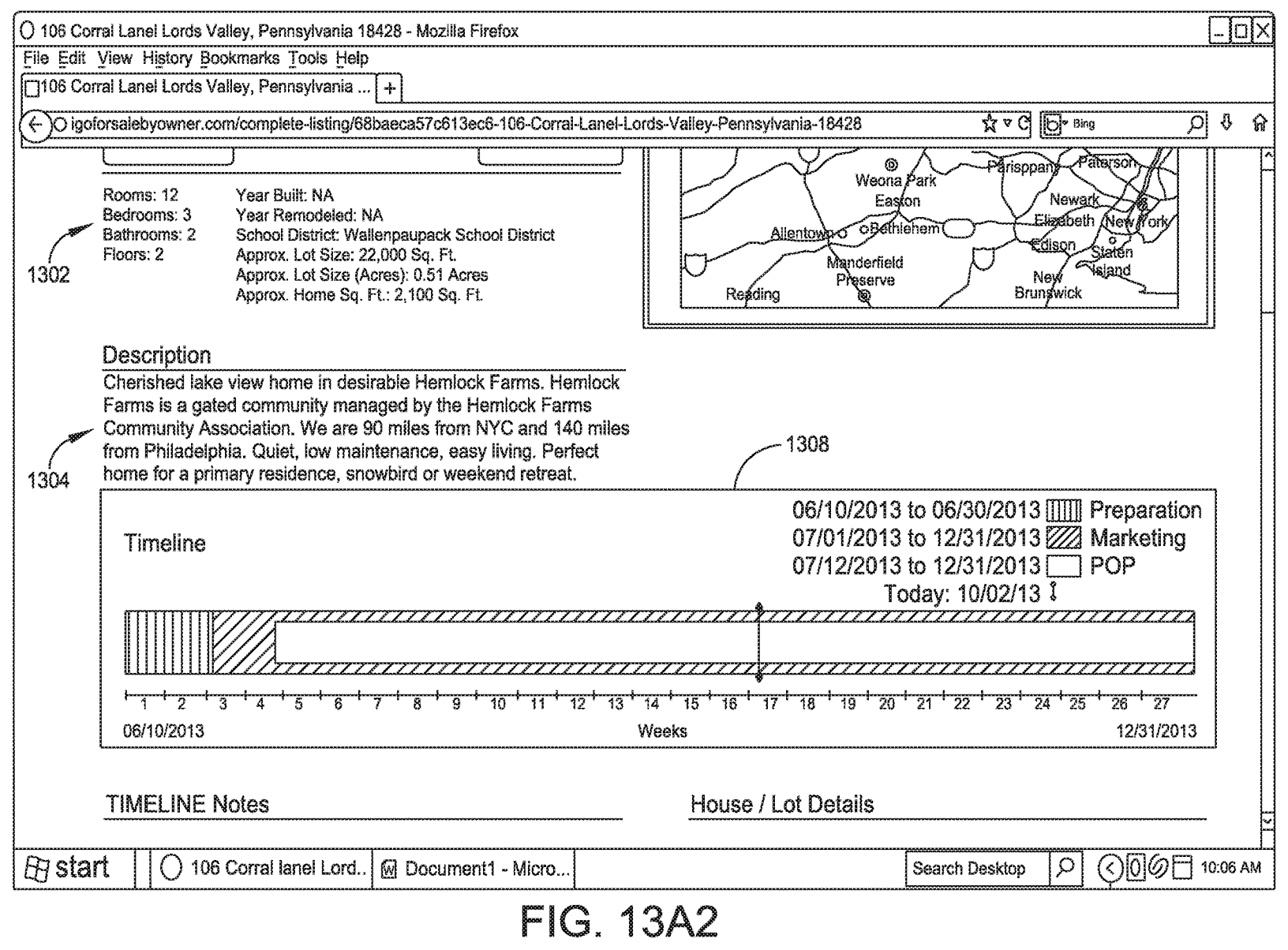
Figure 13C:
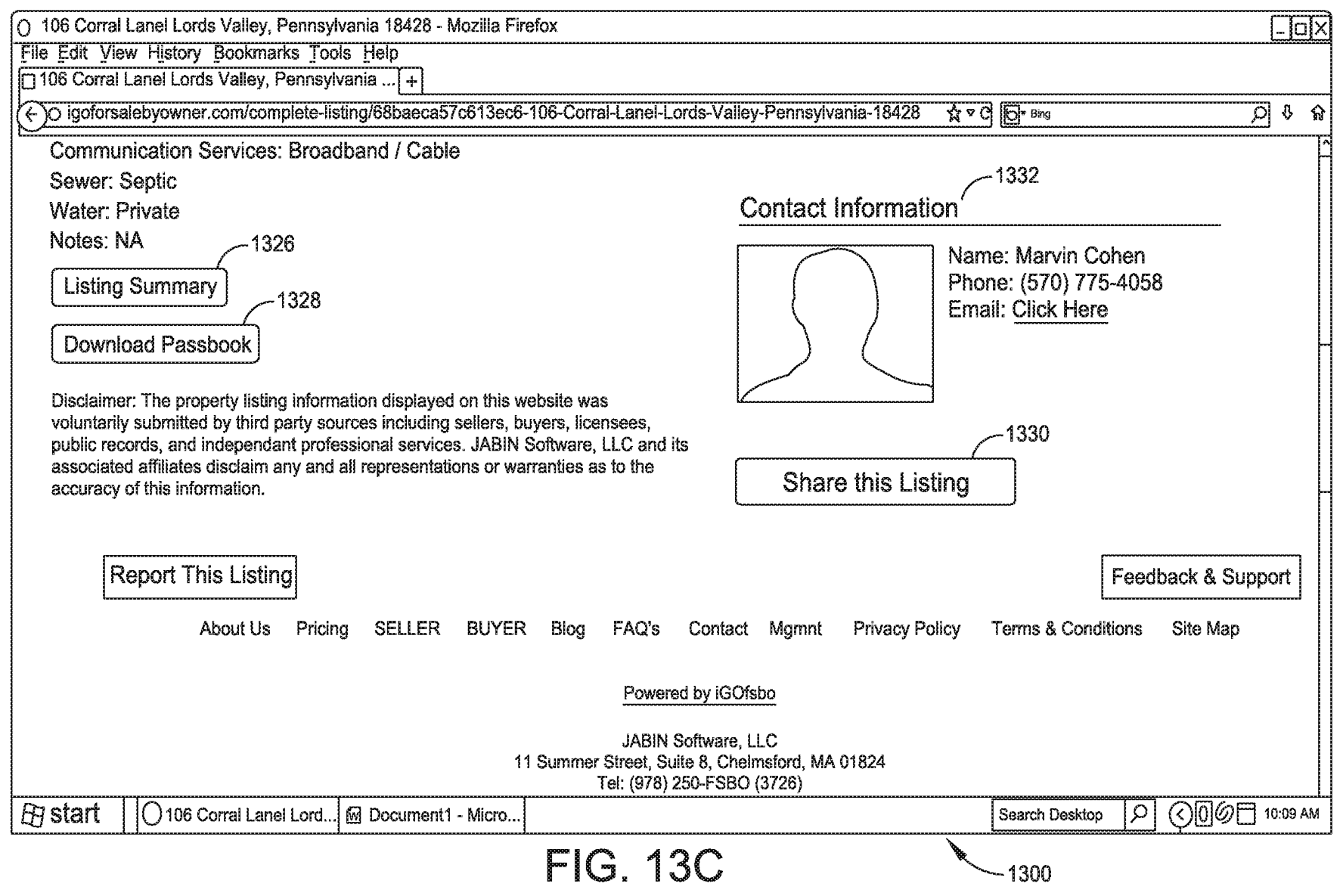

FIGS. 13A-C illustrate display pages of an example user interface 1300 for a detailed listing view. Property details are provided at 1302 and can include a property description 1304 drafted by the seller and/or a support team member. The detailed listing can include a map showing the location of the property 1306, and will also typically include a seller's timeline display 1308. The seller's timeline display will be updated by the system to provide current information on preparation, marketing, and offer acceptance periods. Timeline notes can be displayed on additional pages of the detailed listing (e.g., at 1310). The listing details can also include information on floors and rooms 1312, house/lot details 1314, and exterior features 1316 FIG. 13B. Further information can be provided on Kitchen and Appliances 1318, Utilities 1320, and Area Amenities 1322. In some embodiments, each listing is associated with a QR code shown at 1324, which enables potential buyers to revisit listings simply by scanning the code.

Additional pages of the user interface 1300 shown in FIG. 13C, can include functions, for example, to view a listing summary 1326, download the passbook for the listing at 1328, and share the listing at 1330. Seller contact information can also be provided at 1332. In one embodiment, contact can be directed through support team and contact information at 1332 that provides contact information for the support team.

Figure 14:
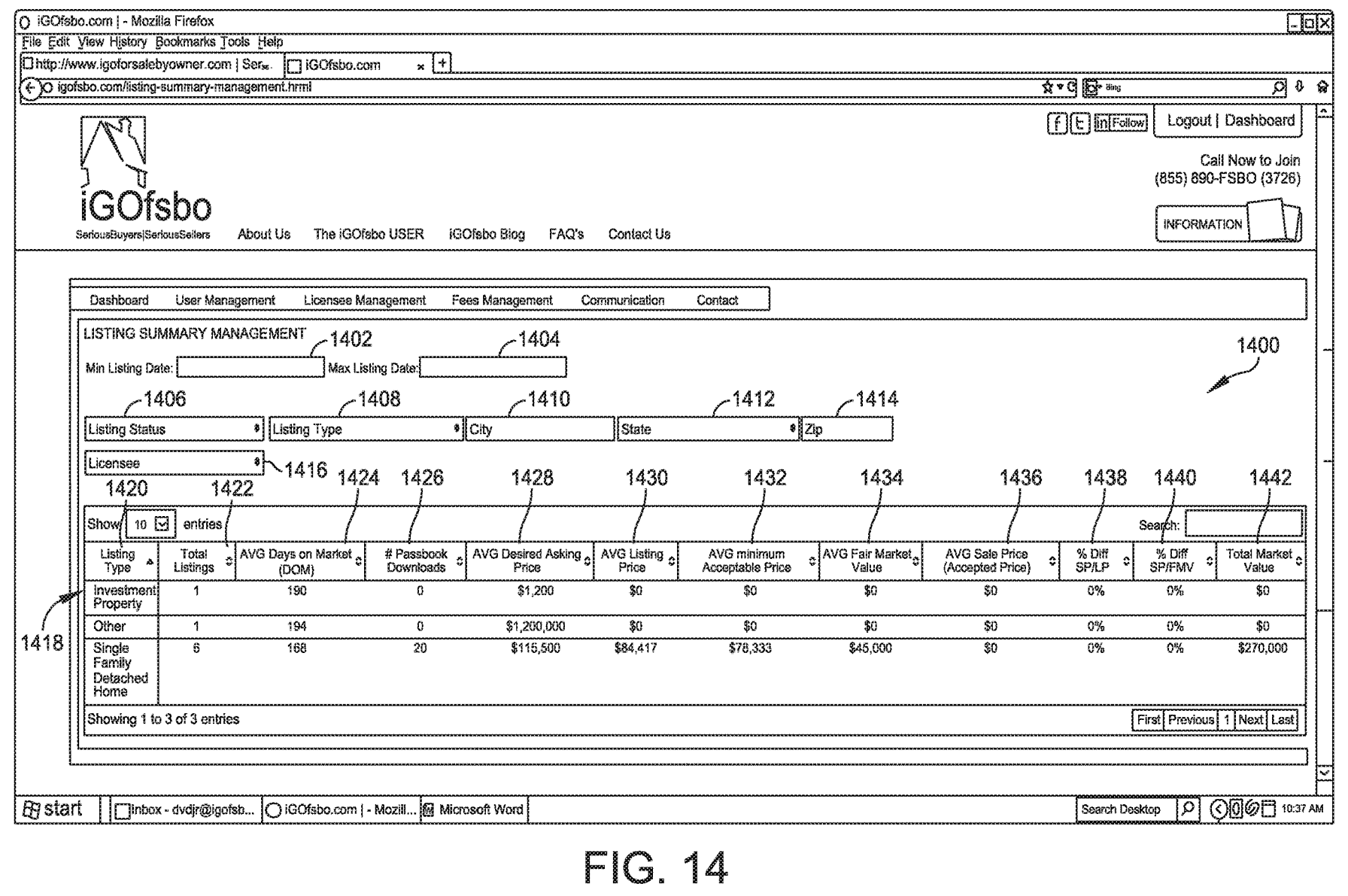

Additional user interfaces e.g., 1400 that can be presented by a fsbo system are shown in FIG. 14. Interface 1400 provides for capturing and displaying summary information on listings stored on an fsbo system according to licensee. A user can input the minimum listing date 1402 and maximum listing date 1404 for any property, listing status 1406, listing type 1408, city 1410, state 1412, and/or zip 1414 to search for matching listings. The search criteria can be further limited by listings associated with a licensee at 1416. Matching listings and aggregate summary information can be displayed at 1418. The summary information can be organized based on listing type 1420, and display information on total listings 1422, average days on market 1424, # of passbook downloads 1426, average desired asking price 1428, average listing price 1430, average minimum acceptable price 1432, average fair market value 1434, average sale price (accepted price) 1436, % difference between sales price and listing price 1438, % difference between sales price and FMV 1440, and total market value 1442, among other examples.

Understanding the Seller's Parameters

The seller's parameter allows the seller to set the price boundary or minimum price limit the seller will accept for their property in advance of the offer process opening. This approach is advantageous for both the buyer and the seller. There is no delay in the decision making process of the offer. Once a buyer enters the fair price they wish to pay for the desired home and hits ENTER on the keyboard, the fsbo system references the listing database and quickly evaluates the offer against stored seller parameters and returns an instant message. Thus, the fsbo approach is private, transparent, and efficient for the benefit of the buyer and the seller. Further, the buyer will know within seconds if their offer has been ACCEPTED, RECOGNIZED or REJECTED.

ACCEPTED

In establishing the ACCEPTED range the seller will define their acceptance parameters during listing creation. The accepted criteria can include a minimum price threshold, which may be set below a listing price. The accepted criteria can also include acceptable contingencies.

RECOGNIZED

In one example, a RECOGNIZED offer has satisfied the seller's desired price, but has been submitted with a contingency. Many times this contingency will be for an unforeseen request, for example a buyer would like the living room drapes or the outside flower pots are requested to be sold with the home. The fsbo system is configured to prompt buyers to discuss any known contingencies with the seller or the support team in advance of making an offer. In other examples, the buyer's offer does not match the Accepted price but is within a tolerable Percentage Variation, and this is also categorized as a RECOGNIZED offer. All RECOGNIZED offers are to be reviewed by the seller.

REJECTED

Offers outside the recognized or accepted parameter are REJECTED without delay. This timely rejection is important and gives the buyer an opportunity to submit a new offer before someone different does.

The Influence of the Seller's Timeline

According to another aspect, the seller's timeline presents the buyer with a schedule for their acquisition of the desired home. In one embodiment, the timeline is publically posted to a website following the first meeting with the support team and updated regularly. During the preparation period the seller and/or the support team are preparing the home for the current market. In this effort, at times, sellers may wish to conduct a garage sale to purge less valuable possessions. In one embodiment, fsbo offers an exclusive service and creates an opportunity for the seller to advertise their garage sale on the fsbo website. Frequently there is an overlap between the Preparation period and the initiation of the Marketing period. Throughout the Marketing period the seller can host open houses by appointment and aggressively advertise their home with the help from their support team.

The offer period typically opens the week following the initiation of the Marketing period. In accordance with one embodiment, as soon as an offer is received that satisfies the pre-determined sales parameters of the seller, a confirming email message is sent to the buyer.

In one embodiment, to create heightened buyer excitement, a vertical line or progression line is displayed on the timeline to illustrate where the seller is in the process of selling their home. The progression line moves left to right and is introduced during the preparation period, prior to the home being officially listed on fsbo platform website (e.g., iGOfsbo.com) and well in advance of the offer acceptance period. This progression line creates a heightened awareness and marketing buzz. Registered buyers receive text/email messages on new properties that satisfy their defined search criteria and can follow the progression line for regular updates of the sellers marketing activities.

Cost Comparison

According to some aspects, by employing the fsbo model a seller or buyer is not compromising or sacrificing on the level of service received. In fact, the fsbo system offers a respectably higher level of service compared to the traditional broker model. The information provided by fsbo is more qualitative and supported by multiple trained professionals skilled in their respective fields. Further, sellers using the fsbo system save a considerable amount of money relative to traditional broker-based sales. In traditional real estate the realtor's commission is paid at the time the house conveys. This protocol has a tendency to cloud the amount of true dollars the seller pays to the real estate broker, especially when the market is strong. Where the market is soft, the seller may lose money. For example, where the seller purchased the home 10 years prior and the home appreciates only 4% in the ten year period and the seller pays the broker a commission of 5% to sell the home, the seller losses money.

It should be appreciated that because the costs to the seller are a fixed sum, as the home sale price increases, the percentage-cost to the seller decreases. This is possible because fsbo does not use a percent commission like the traditional real estate broker and other broker variations. Thus, the seller of a house that sells for 500,000 can be expected to pay an order of magnitude less than if that house was sold for the same amount of money using a traditional broker receiving a commission of 5%. The savings to the seller increase dramatically as the sale price increases.

The Real Estate Market

It is appreciated that buyers and the sellers can no longer afford the commission paid to the traditional broker/agent. On average, the commission paid to the broker is 5% above the true realistic market value of the home. Consequently, the buyer of the home is financing the commission paid to the broker/agent. A $20,000 commission factored into the sales price of the home amortized over a 30 year loan will cost the buyer nearly $60,000 in extra, unnecessary mortgage payments. In the alternative, the commission paid to the broker/agent can also be taken from the seller's noted profit. Therefore the broker/agent is draining the appreciated equity recognized in the seller's home (if any) for the benefit of the broker/agent. The traditional broker/agent model works for the benefit of the broker/agent, but negatively impacts the seller, the buyer and the general real estate market.

Today's real estate market is struggling to find a home's true market value. Many times loans are denied or canceled because the home appraisal cannot satisfy the anticipated financial commitment from the lender, possibly because the broker incorrectly priced the home. Unfortunately this denial is not known until after the buyer's offer has been accepted and many people have performed unnecessary work. This approach is extremely inefficient and subsequently a waste of time. The fsbo system is uniquely different; and causes a seller to appraise their home to determine the fair market value during the Preparation Period-weeks before a home is listed on the open market or an offer is made. Accordingly, the system benchmarks the sales price of a home to the true appraised value without a commission. This avoids lender's complications, seller's frustration and remarkably improves the efficiency of selling a home.

In some implementations, the fsbo system reduces costs over conventional broker approaches. The fsbo system does provide monetization of the described processes, including for example, registration-setup charges and monthly fees for licensees. Additionally like most SAAS implementations, licensees can be charged per use or based a number or amount of compute resources executed on their behalf. Additionally, transaction fees can be collected once a purchase offer has been accepted.

Personnel

In accordance with one embodiment, each user is assigned a support team. In some examples, the buyers are not assigned their own support team but rather refer questions and request information from the seller assigned support team. In one example, a seller is assigned one fsbo-MD and one fsbo-REP. The fsbo-REP is the team leader and the voice of fsbo and the fsbo-MD is the face of fsbo and works in the field. In accordance with this embodiment, the fsbo-REP and fsbo-MD are full time employees of fsbo. In licensee models, different support team assignments can be used.

Appraisal Company & Inspection Company

For the convenience of the seller, in one embodiment, the fsbo system maintains a list of associated appraisal and inspection professionals. The support team can informally interview desired vendors to confirm each vendor is licensed and bonded in the state of operation. In some examples, licensees have their own recognized vendors to be listed through the fsbo system.

Various implementations can yield a variety of advantages to the buyer and seller, which may include any one or more of the following:

1. Seller

Various embodiments permit sellers to market their home at the true market price without imposing an additional broker commission. By not paying a commission, the seller keeps a much greater percentage of the sales price of their home.

Compared to any other method of selling a home, embodiments of the present invention use dedicated professionals such as inspectors, appraisers, and videographers to assist in the marketing and selling of the home. Further, for the seller, because buyers are to provide confirmation of mortgage preapproval prior to registering with the system and becoming a "Serious buyer," the system helps to ensure that all offers are valid and further protects the security of the seller and their home.

2. Buyer

Various embodiments also provide numerous benefits to the buyer and make it easy for a buyer to locate a home in the buyer's target area by providing a rich database of all properties registered for sale by owner in one easy to use site that is easy to navigate. In advance of attending an open house, a registered buyer receives a complimentary seller's passbook, providing the buyer with a seller's timeline, a detailed listing sheet of the home, a home operating budget, a full independent professional Appraisal report, a full professional home inspection report, a copy of the seller's Disclosure statement, among other examples. Various embodiments remove haggling from the process of purchasing a home and bestow confidence in the buyer that the price they are paying corresponds to the true market value of the home. Thus, the buyer can feel confident that have made an informed decision. In one example, the inspection report provided to the buyer enables the buyer to assess the condition of the home, prior to offer, and to identify all the home imperfections and determine which are minor or major. After submitting an offer, the buyer receives a nearly instantaneous response informing the buyer as to whether their offer was accepted, rejected, or recognized. According to one aspect, this prevents the seller from shopping the buyer's bid and essentially using the buyer's good faith offer to increase the sales price of the home. Further because the identity of the buyer is concealed until after the offer is accepted, a buyer will not feel they have been a victim of discrimination or that their bid has been overlooked.

Example Computer System

As discussed above with regard to FIG. 1 and FIGS. 3A-B, various aspects and functions described herein may be implemented as specialized hardware or software modules executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system, may be distributed among a plurality of computer systems connected to one or more communications networks, or may be cloud based.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and modules using a variety of hardware and software configurations, and examples are not limited to any particular distributed architecture, network, or communication protocol.

Referring to FIG. 15, there is illustrated a block diagram of a distributed computer system 1500, in which various aspects and functions are practiced. As shown, the distributed computer system 1500 includes one or more computer systems that exchange information. More specifically, the distributed computer system 1500 includes specially configured computer systems 1502, 1504 and 1506. As shown, the computer systems 1502, 1504 and 1506 are interconnected by, and may exchange data through, a communication network 1508. For example, a fsbo system, subsystems, and/or modules can be implemented on 1502, which can communicate with other systems (1504-1506), which operate together to provide the functions and operations as discussed herein.

In some embodiments, the network 1508 may include any communication network through which computer systems may exchange data. To exchange data using the network 1508, the computer systems 1502, 1504 and 1506 and the network 1508 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS15, JSON, SOAP, CORBA, REST and Web Services. To ensure data transfer is secure, the computer systems 1502, 1504 and 1506 may transmit data via the network 1508 using a variety of security measures including, for example, TLS, SSL or VPN. While the distributed computer system 1500 illustrates three networked computer systems, the distributed computer system 1500 is not so limited and may include any number of computer systems and computing devices, networked using any medium and communication protocol.

As illustrated in FIG. 15, the computer system 1502 includes at least one processor 1510, a memory 1512, a bus 1514, an interface 1516 and data storage 1518. To implement at least some of the aspects, functions and processes disclosed herein, the processor 1510 performs a series of instructions that result in manipulated data. The processor 1510 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 1510 is connected to other system components, including one or more memory devices 1512, by the bus 1514.

The memory 1512 stores programs and data during operation of the computer system 1502. Thus, the memory 1512 may be a relatively high performance, volatile, random access memory such as a dynamic random access memory (DRAM) or static memory (SRAM). However, the memory 1512 may include any device for storing data, such as a disk drive or other non-volatile storage device. Various examples may organize the memory 1512 into particularized and, in some cases, unique structures to perform the functions disclosed herein. These data structures may be sized and organized to store values for particular data and types of data.

Components of the computer system 1502 are coupled by an interconnection element such as the bus 1514. The bus 1514 may include one or more physical busses, for example, busses between components that are integrated within the same machine, but may include any communication coupling between system elements including specialized or standard computing bus technologies such as IDE, SCSI, PCI and InfiniBand. The bus 1514 enables communications, such as data and instructions, to be exchanged between system components of the computer system 1502.

The computer system 1502 also includes one or more interface devices 1516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1502 to exchange information and to communicate with external entities, such as users and other systems.

The data storage 1518 includes a computer readable and writeable nonvolatile, or non-transitory, data storage medium in which instructions are stored that define a program or other object that is executed by the processor 1510. The data storage 1518 also may include information that is recorded, on or in, the medium, and that is processed by the processor 1510 during execution of the program. More specifically, the information may be stored in one or more data structures specifically configured to conserve storage space or increase data exchange performance.

The instructions stored in the date storage may be persistently stored as encoded signals, and the instructions may cause the processor 1510 to perform any of the functions described herein. The medium may be, for example, optical disk, magnetic disk or flash memory, among other options. In operation, the processor 1510 or some other controller causes data to be read from the nonvolatile recording medium into another memory, such as the memory 1512, that allows for faster access to the information by the processor 1510 than does the storage medium included in the data storage 1518. The memory may be located in the data storage 1518 or in the memory 1512, however, the processor 1510 manipulates the data within the memory, and then copies the data to the storage medium associated with the data storage 1518 after processing is completed. A variety of components may manage data movement between the storage medium and other memory elements and examples are not limited to particular data management components. Further, examples are not limited to a particular memory system or data storage system.

Although the computer system 1502 is shown by way of example as one type of computer system upon which various aspects and functions may be practiced, aspects and functions are not limited to being implemented on the computer system 1502 as shown in FIG. 15. Various aspects and functions may be practiced on one or more computers having different architectures or components than that shown in FIG. 15. For instance, the computer system 1502 may include specially programmed, special-purpose hardware, such as an application-specific integrated circuit (ASIC) tailored to perform a particular operation disclosed herein. While another example may perform the same function using a grid of several general-purpose computing devices running MAC OS SYSTEM X with MOTOROLA POWERPC processors and several specialized computing devices running proprietary hardware and operating systems.

The computer system 1502 may be a computer system including an operating system that manages at least a portion of the hardware elements included in the computer system 1502. In some examples, a processor or controller, such as the processor 1510, executes an operating system. Examples of a particular operating system that may be executed include a Windows-based operating system, such as, WINDOWS NT, 2000 (ME), XP, VISTA, 7 or 8 operating systems, available from the Microsoft Corporation, a MAC OS SYSTEM X operating system available from Apple Computer, one of many LINUX-based operating system distributions, for example, the Enterprise LINUX operating system available from Red Hat Inc., a SOLARIS operating system available from Sun Microsystems, or a UNIX operating systems available from various sources. Many other operating systems may be used, and examples are not limited to any particular operating system.

The processor 1510 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .NET, SMALLTALK, JAVA, C++, ADA, C# (C-SHARP), OBJECTIVE C, or JAVASCRIPT. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A system for automated processing of real estate transactions, the system comprising:
  a memory; and
  at least one processor operatively connected to the memory, the at least one processor when executing being configured to:
  generate a seller user interface configured to receive at least one seller parameter and create a listing to be viewed by a buyer;
  receive, through the seller user interface, the at least one seller parameter based on input from a seller, the at least one seller parameter including a minimum value associated with a sale of a property and one or more acceptable purchase conditions for a sale of the property in real time or near real time;
  create, via the input, a dynamic timeline display included in the listing specifying a plurality of timeline periods comprising a preparation period, a marketing period, and an offer acceptance period for the property;
  maintain the minimum value and the one or more acceptable purchase conditions associated with the sale of the property confidential with the seller;
  receive, for each of the plurality of timeline periods, a completion status of the respective timeline period;

update the dynamic timeline display to display progression of at least one of the plurality of timeline periods responsive to the completion status of the at least one of the plurality of timeline periods;

generate a buyer user interface configured to receive a search query from the buyer;

retrieve, responsive to receiving the search query from the buyer, one or more listings that match the query, the one or more listings including the listing created by the seller; and responsive to the current timeline period being an offer acceptance period, the at least one processor being configured to:

receive, from the buyer user interface, a binding offer from the buyer, the binding offer including at least an offer price and at least one buyer condition;

automatically evaluate the binding offer against the at least one seller parameter to determine a status, wherein the status includes an accepted status for offers meeting the minimum value associated with the sale of the property and for the at least one buyer condition meeting the one or more acceptable purchase conditions for the sale of the property;

responsive to the offer having the accepted status, in real time or near real time, bind the seller and the buyer to complete the sale of the property without further interaction by the buyer or the seller and update the dynamic timeline display to reflect that the listing is concluded; and communicate to the buyer, via the buyer user interface, information on the sale of the property.

2. The system of claim 1, wherein the status is at least one of accepted, rejected, and recognized.

3. The system of claim 1, wherein the at least one processor is further configured to evaluate the offer against at least one of accepted criteria, rejected criteria, and recognized criteria based on the at least one seller parameter.

4. The system of claim 3, wherein the at least one processor is further configured to determine the status is recognized, responsive to determining that the offer price is equal to or greater than the minimum value and includes at least one request not included in the at least one seller parameter.

5. The system of claim 3, wherein the at least one processor is further configured to determine that the status is recognized, responsive to determining that the offer price is within a predefined variation of the minimum value.

6. The system of claim 1, wherein the at least one processor is further configured to receive an appraisal for the property as part of the sale of the property.

7. The system of claim 1, wherein the at least one processor is further configured to require a mortgage pre-approval for the buyer in order to receive the offer.

8. The system of claim 1 wherein responsive to the current timeline period being the offer acceptance period, the at least one processor being configured to:

receive, from the buyer user interface, the binding offer from the buyer in real time or near real time; and automatically evaluate the binding offer against the at least one seller parameter to determine the status in real time or near real time.

* * * * *